United States Patent
Veige

(10) Patent No.: US 11,725,068 B2
(45) Date of Patent: *Aug. 15, 2023

(54) CYCLIC POLYOLEFINS DERIVED FROM HEXYNE, OCTYNE, NONYNE, PENTADECYNE AND THEIR COPOLYMERS WITH ACETYLENE

(71) Applicant: University of Florida Research Foundation, Inc., Gainesville, FL (US)

(72) Inventor: Adam S. Veige, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,693

(22) Filed: Sep. 24, 2021

(65) Prior Publication Data

US 2022/0025082 A1 Jan. 27, 2022

Related U.S. Application Data

(60) Continuation of application No. 16/792,963, filed on Feb. 18, 2020, now Pat. No. 11,155,653, which is a division of application No. 15/712,767, filed on Sep. 22, 2017, now Pat. No. 10,730,972.

(51) Int. Cl.
```
C08F 8/04      (2006.01)
C08F 38/00     (2006.01)
C08F 2/06      (2006.01)
C08F 4/22      (2006.01)
C08F 138/00    (2006.01)
```

(52) U.S. Cl.
CPC ............... *C08F 38/00* (2013.01); *C08F 2/06* (2013.01); *C08F 4/22* (2013.01); *C08F 8/04* (2013.01); *C08F 138/00* (2013.01); *C08F 2800/10* (2013.01)

(58) Field of Classification Search
CPC ....... C08F 2500/25; C08F 38/00; C08F 38/02
See application file for complete search history.

(56) References Cited

U.S. PATENT DOCUMENTS

| | | |
|---|---|---|
| 6,525,197 B1 | 2/2003 | Furstner et al. |
| 2004/0132934 A1 | 7/2004 | Grubbs et al. |

OTHER PUBLICATIONS

Jia, Journal of Polymer Science Part A: Polymer Chemistry, 2012, 50, p. 2085-2097 (Year: 2012).*
Asenjo-Sanz et al., Zwitterionic polymerization of glycidyl monomers to cyclic polyethers with B(C6F5)3, Polym. Chem., 5:6905-6908 (2014).
Bannister et al., Studies of cyclic and linear poly(dimethyl siloxanes): 6. Effect of heat, Polymer., 22:377-381 (1981).
Benmouna et al., U. in Cyclic Polymers (ed. Semiyen, J. A.) 781-782 (Kluwer Academic Publishers) (2000).
Bielawski et al., An "Endless" Route to Cyclic Polymers, Science, 297:2041-2044 (2002).
Bielawski et al., Synthesis of cyclic polybutadiene via ring-opening metathesis polymerization: the importance of removing trace linear contaminants, J. Am. Chem. Soc., 125:8424-8425 (2003).
Boydston et al., Cyclic Ruthenium-Alkylidene Catalysts for Ring-Expansion Metathesis Polymerization, J. Am. Chem. Soc., 130(38):12775-12782 (2008).
Brown et al., Zwitterionic ring-opening polymerization for the synthesis of high molecular weight cyclic polymers, Am. Chem. Res., 46:2585-2596 (2013).
Brown et al., Zwitterionic polymerization to generate high molecular weight cyclic poly(carbosiloxane)s, J. Am. Chem. Soc, 135:18738-18741 (2013).
Clarson et al., Studies of cyclic and linear poly(dimethylsiloxanes): 19. Glass-transition temperatures and crystallization behavior, Polymer, 26:930-934 (1985).
Cope et al., Cyclic Polyolefins. XXII. Substituted Cyclooctatetraenes from Substituted Acetylenes, J. Amer. Chem. Soc., 74(1):179-183 (1952).
Dutta et al., Synthesis and self-assembly of triphenylene-containing conjugated macrocycles, RSC Adv., 3: 6008-6015 (2013).
Final Office Action dated Jul. 1, 2019 in corresponding U.S. Appl. No. 15/712,767.
Flory et al., Macrocyclization equilibrium constants and the statistical configuration of poly (dimethylsiloxane) chains, J. Am. Chem. Soc., 88:3209-3212 (1966).
Garcia Bernal et al., Monte Carlo calculation of hydrodynamic properties of linear and cyclic polymers in good solvents, Macromolecules, 24:593-598 (1991).
Gonsales et al., Highly Tactic Cyclic Polynorbornene: Stereoselective Ring Expansion Metathesis Polymerization of Norbornene Catalyzed by a New Tethered Tungsten-Alkylidene Catalyst, J. Am. Chem. Soc., 138(15):4996-4999 (2016).
Griffiths et al., Role of molecular architecture in polymer diffusion: a PGSE-NMR study of linear and cyclic poly ( ethylene oxide), J. Phys. Chem., 99:16752-16756 (1995).
Hans R. Kricheldorf et al., Polylactones. 35. Macrocyclic and stereoselective polymerization of .beta.-D,L-butyrolactone with cyclic dibutyltin initiators. Macromolecules, 28:6718-6725 (1995).
Hoskins et al., Cyclic polyesters: synthetic approaches and potential applications, Polym. Chem., 2: 289-299 (2011).
Hoskins, J. N. & Grayson, S. M. Synthesis and degradation behavior of cyclic poly(.epsilon.-caprolactone), Macromolecules, 42:6406-6413 (2009).
International Application No. PCT/IB2018/056448, International Search Report and Written Opinion, dated Dec. 17, 2018.
Ishizu, K. K. H., Novel synthesis and characterization of cyclic polystyrenes, Polymer., 37:1487-1492 (1996).
Iyoda et al., Conjugated macrocycles: concepts and applications, Angew. Chem. Int. Ed., 50:10522-10553 (2011).
Jia et al., Cyclic polymers: methods and strategies, J. Polym. Sci., 50:2085-2097 (2012).

(Continued)

*Primary Examiner* — Robert C Boyle
(74) *Attorney, Agent, or Firm* — Marshall, Gerstein & Borun LLP

(57) ABSTRACT

Disclosed are saturated cyclic monopolymers derived from hexyne, octyne, nonyne, pentadecyne and saturated cyclic copolymers derived from acetylene and a second alkyne monomer that is hexyne, octyne, nonyne, or pentadecyne.

13 Claims, 14 Drawing Sheets

(56) References Cited

OTHER PUBLICATIONS

Kapnistos et al. Unexpected power-law stress relaxation of entangled ring polymers, Nature Mater., 7:997-1002 (2008).

Kricheldorf, H. R., Cyclic polymers: synthetic strategies and physical properties, J. Polym. Sci., 48:251-284 (2010).

Kricheldorf et al., Polymers of carbonic acid, 30 ring-expansion polymerization of trimethylene carbonate (TMC, 1,3-dioxanone-2) with dibutyltin succinate or adipate, Macromol. Chem. Phys., 202:413-420 (2001).

Kuppuswamy et al., Synthesis and Characterization of Tungsten(VI) Alkylidene Complexes Supported by an [OCO]3- Trianionic Pincer Ligand: Progress towards the [tBuOCO]W≡CC(CH3)3 Fragment, Organometallics, 29(19):4227-4233 (2010).

Laurent et al., Synthetic approaches for the preparation of cyclic polymers. Chem. Soc. Rev., 38:2202-2213 (2009).

Mastrorilli et al. Polymerization of phenylacetylene and of p-tolylacetylene catalyzed by .beta.-dioxygenatorhodium(I), complexes in homogeneous and heterogeneous phase, J. Mol. Catal., 178:35-42 (2002).

McGowan et al., Compelling mechanistic data and identification of the active species in tungsten-catalyzed alkyne polymerizations: conversion of a trianionic pincer into a new tetraanionic pincer-type ligand, Chem. Sci., 1145-1155 (2013).

Midya et al., Ligand mediated iron catalyzed dimerization of terminal aryl alkynes: scope and limitations, Org. Bio. Chem., 12:1812-1822 (2014).

Nakao et al., Giant macrocycles composed of thiophene, acetylene, and ethylene building blocks, J. Am. Chem. Soc., 128:16740-16747 (2006).

Non Final Office Action dated Apr. 12, 2019 in corresponding U.S. Appl. No. 15/712,767.

Non Final Office Action dated Sep. 22, 2017 in corresponding U.S. Appl. No. 15/712,767.

O'Reilly et al., Trianionic pincer and pincer-type metal complexes and catalysts, Chem. Soc. Rev., 43:6325-6369 (2014).

Orrah et al., Studies of cyclic and linear poly(dimethylsiloxanes): 28. Viscosities and densities of ring and chain poly (dimethylsiloxane) blends, Polymer., 29:1455-1458 (1988).

Pangilinan et al., Cyclic polymers and catenanes by atom transfer radical polymerization (ATRP), Polym. Int., 63:803-813 (2014).

Pasini, D. The click reaction as an efficient tool for the construction of macrocyclic structures, Molecules, 18:9512-9530 (2013).

Patel et al., Studies of cyclic and linear poly(dimethylsiloxanes): 30. Adsorption studies on silica in solution, Polymer., 32:1313-1317 (1991).

Roland et al., CyCyclic polymers from alkynes, Nature Chemistry, 8(8)791-796 (2016).

Roovers, Dilute-solution properties of ring polystyrenes, J. Polym. Sci., 23:1117-1126 (1985).

Santangelo et al., Dynamics near the Glass Temperature of Low Molecular Weight Cyclic Polystyrene, Macromolecules, 34(26):9002-9005 (2001).

Semiyen, J. A., Cyclic Polymers, 2nd ed., Kluwer Academic Publishers (2000).

Shin et al. Crystallization of cyclic polymers: synthesis and crystallization behavior of high molecular weight cyclic poly(.epsilon.-caprolactone)s, Macromolecules, 44:2773-2779 (2011).

Tezuka, Y. Topological Polymer Chemistry: Progress of Cyclic Polymers in Syntheses, Properties and Functions, World Scientific Publishing Company (2012).

Trhlikova et al., [Rh(cycloolefin)(acac)] complexes as catalysts of polymerization of aryl- and alkylacetylenes: influence of cycloolefin ligand and reaction conditions, J. Mol. Catal., 378, 57-66 (2013).

Xia, Y. et al. Ring-expansion metathesis polymerization: catalyst-dependent polymerization profiles, J. Am. Chem. Soc., 131:2670-2677 (2009).

Xu et al., "Oligomerization and cyclization reactions of acetylene", Physical Chemistry Chemical Physics, 7:326-333 (2005).

Zimm, B. H. & Stockmayer, W. H. The dimensions of chain molecules containing branches and rings, J. Chem. Phys., 17:301-1314 (1949).

\* cited by examiner

CYCLIC POLYOLEFINS DERIVED FROM HEXYNE, OCTYNE, NONYNE, PENTADECYNE AND THEIR COPOLYMERS WITH ACETYLENE

CROSS-REFERENCE TO RELATED APPLICATIONS

This application is a Continuation of U.S. patent application Ser. No. 16/792,963, which is a Divisional of U.S. patent application Ser. No. 15/712,767 filed Sep. 22, 2017, the entirety of which is herein incorporated by reference. This application makes reference to the following patent applications and patents: International Patent Application No. PCT/US2015/034888, entitled "Metallacycloalkylene Complexes and Use for Alkyne Polymerization to Cyclic Polyacetylenes," filed Jun. 9, 2015; which is a continuation-in-part of U.S. patent application Ser. No. 14/299,449, entitled "Tridentate Pincer Ligand Supported Metal-Alkylidyne and Metallacycloalkylene Complexes for Alkyne Polymerization," filed Jun. 9, 2014, now U.S. Pat. No. 9,206,266, issued Dec. 8, 2015, which claims priority from U.S. Provisional Patent Application No. 61/845,764, filed Jul. 12, 2013, and is a continuation-in-part of PCT/US2012/065841, filed Nov. 19, 2012, which claims priority from U.S. Provisional Patent Application No. 61/567,909, filed Dec. 7, 2011.

U.S. patent application Ser. No. 15/286,780, entitled "ONO Pincer Ligands and ONO Pincer Ligand Comprising Metal Complexes," filed Oct. 6, 2016, which is a division of U.S. patent application Ser. No. 14/077,822, filed Nov. 12, 2013, now U.S. Pat. No. 9,464,104, issued Oct. 11, 2016, which is a continuation in part of PCT/US2012/037302, filed May 10, 2012, which claims priority from Provisional Patent Application No. 61/484,793, filed May 11, 2011.

U.S. patent application Ser. No. 13/872,544, entitled "Method for Linking Two or More Metals for Photo and Electronic Materials," filed Apr. 29, 2013, now U.S. Pat. No. 8,889,879, issued Nov. 18, 2014, which is a continuation in part of PCT/US2011/057851, filed Oct. 26, 2011, which claims priority from Provisional Patent Application No. 61/407,248, filed Oct. 27, 2010. U.S. patent application Ser. No. 13/852,611, entitled "NCN Trianionic Pincer Complexes as Catalysts for Olefin Polymerization and Isomerization," filed Mar. 28, 2013, now U.S. Pat. No. 9,637,425, issued Oct. 31, 2013, which is a continuation in part of PCT/US2011/052532, filed Sep. 21, 2011, that claims priority from U.S. Provisional Patent Application No. 61/387,288, filed Sep. 28, 2010.

U.S. patent application Ser. No. 13/254,510, entitled "Trianionic Pincer Ligands, a CR(III)/CR(V) Catalytic System and Its Use for Catalytic Aerobic Oxidation of Organic Substrates," filed Sep. 2, 2011, now U.S. Pat. No. 8,846,950, issued Sep. 30, 2014, which is a continuation in part of PCT/US2010/26034, filed Mar. 3, 2010, which claims priority from Provisional Patent Application No. 61/156,946, filed Mar. 3, 2009.

U.S. patent application Ser. No. 12/437,845, entitled "Method for Transferring N-Atoms from Metal Complexes to Organic and Inorganic Substrates," filed May 8, 2009, now U.S. Pat. No. 8,063,236, issued Nov. 22, 2011, which claims priority from U.S. Provisional Patent Application No. 61/051,599, filed May 8, 2008.

U.S. patent application Ser. No. 13/790,720, entitled "Catalysts Containing N-Heterocyclic Carbenes for Enantioselective Synthesis," filed Mar. 8, 2013, now U.S. Pat. No. 8,691,998, issued Apr. 8, 2014, which is a division of U.S. patent application Ser. No. 12/527,635, filed Jan. 20, 2010, now U.S. Pat. No. 8,455,661, issued Jun. 4, 2013, which is a continuation in part of PCT/US2008/054137, filed Feb. 15, 2008, which claims priority from U.S. Provisional Patent Application No. 60/985,205, filed Nov. 3, 2007 and U.S. Provisional Patent Application No. 60/890,484, filed Feb. 18, 2007.

U.S. Provisional Patent Application No. 62/561,941, entitled "Macrocyclic Poly(Alkane)S and Poly(Alkane-Co-Alkene)S," Filed Sep. 22, 2017.

The entire contents and disclosures of these patent applications and patents are incorporated herein by reference.

STATEMENT OF JOINT RESEARCH AGREEMENT

In compliance with 37 C.F.R. § 1.71(g)(1), disclosure is herein made that the inventions described and claimed herein were made pursuant to a Joint Research Agreement (LAW-2015-0682) as defined in 35 U.S.C. 103 (c)(3), that was in effect on or before the date the inventions were made, and as a result of activities undertaken within the scope of the Joint Research Agreement, by or on the behalf of ExxonMobil Chemical Company, a division of Exxon Mobil Corporation, and the University of Florida.

BACKGROUND

Field of the Invention

The disclosed invention relates generally to cyclic polymers.

Related Art

Cyclic polymers have dramatically different physical properties compared with those of their equivalent linear counterparts. However, the exploration of cyclic polymers is limited because of the inherent challenges associated with their synthesis. Conjugated linear polyacetylenes are important materials for electrical conductivity, paramagnetic susceptibility, optical nonlinearity, photoconductivity, gas permeability, liquid crystallinity and chain helicity. However, their cyclic analogues are unknown, and therefore the ability to examine how a cyclic topology influences their properties is currently not possible. There is a need to rapidly polymerize alkynes to form conjugated macrocycles in high yield.

SUMMARY

According to first broad aspect, the disclosed invention provides a composition comprising a saturated cyclic copolymer having a structural formula:

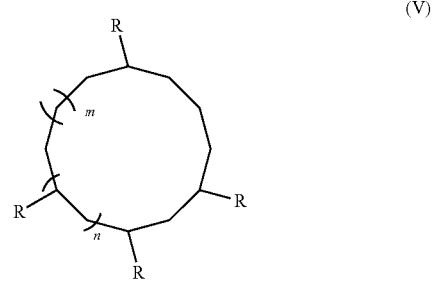

wherein: R is n-butyl, n-hexyl, n-heptyl, n-tetradecane; n and m each has various values, with a ratio of n/m<1.

According to a second broad aspect, the disclosed invention provides a composition comprising a saturated cyclic homopolymer having a structural formula:

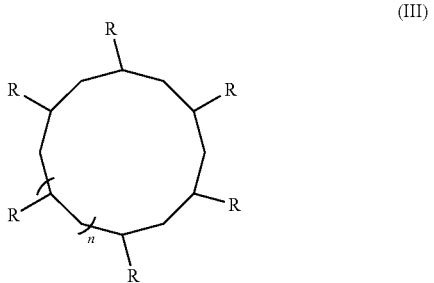

(III)

wherein: R is n-butyl, n-hexyl, n-heptyl, n-tetradecane; n 1.

According to a third broad aspect, the disclosed invention provides a method of preparing a saturated cyclic polymer. The method comprises hydrogenating an unsaturated cyclic polymer using a hydrogenation catalyst to produce a saturated cyclic polymer. The saturated cyclic polymer comprises a saturated cyclic homopolymer or a saturated cyclic copolymer. The saturated cyclic homopolymer has a structural formula:

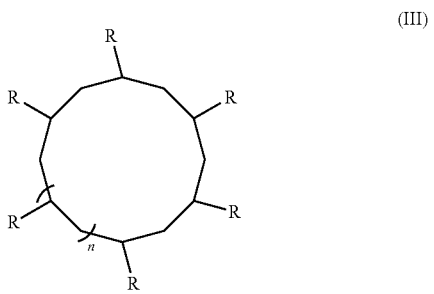

(III)

wherein: R is n-butyl, n-hexyl, n-heptyl n-tetradecane; n≥1.
The saturated cyclic copolymer has a structural formula:

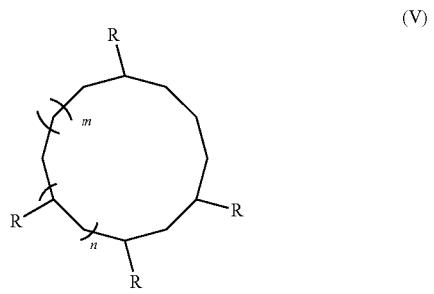

(V)

wherein: R is n-butyl, n-hexyl, n-heptyl, n-tetradecane; n and m each has various values, with a ratio of n/m<1.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Figure 1:
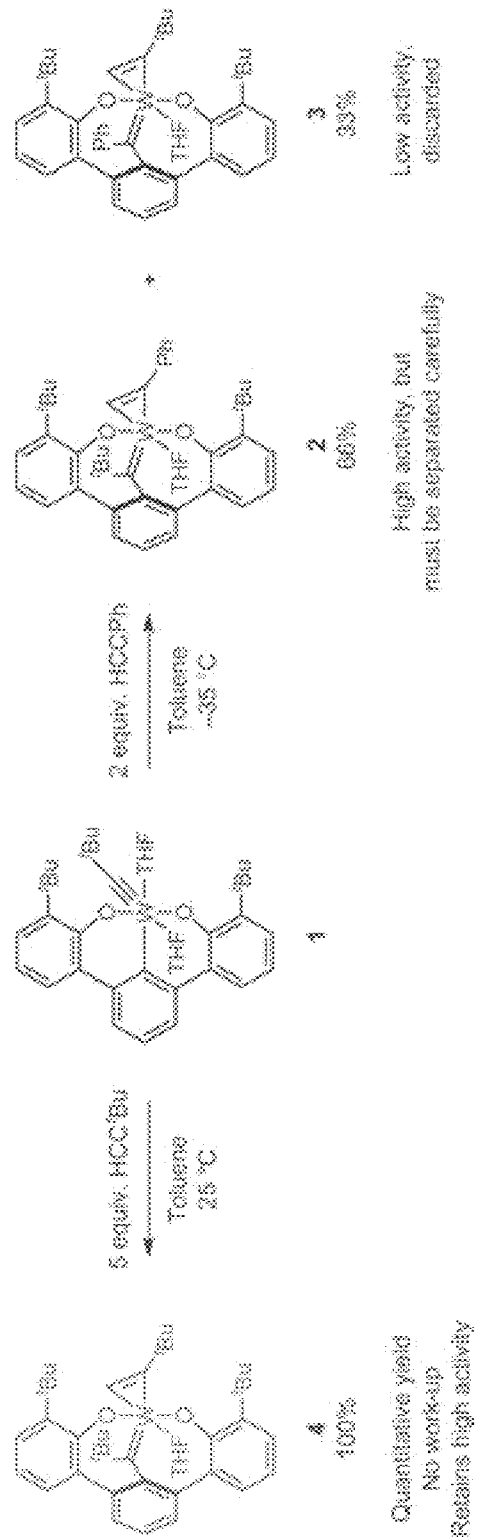
FIG. 1 illustrates the synthesis of a catalyst (complex 4), according to an embodiment of the disclosed invention.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the disclosed invention, the term "comprising", the term "having", the term "including," and variations of these words are intended to be open-ended and mean that there may be additional elements other than the listed elements.

For purposes of the disclosed invention, directional terms such as "top," "bottom," "upper," "lower," "above," "below," "left," "right," "horizontal," "vertical," "up," "down," etc., are used merely for convenience in describing the various embodiments of the disclosed invention. The embodiments of the disclosed invention may be oriented in various ways. For example, the diagrams, apparatuses, etc., shown in the drawing figures may be flipped over, rotated by 90° in any direction, reversed, etc.

For purposes of the disclosed invention, a value or property is "based" on a particular value, property, the satisfaction of a condition, or other factor, if that value is derived by performing a mathematical calculation or logical decision using that value, property or other factor.

For purposes of the disclosed invention, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the disclosed invention, the term "analogue" and the term "analog" refer to one of a group of chemical compounds that share structural and/or functional similarities but are different in respect to elemental composition. A structural analog is a compound having a structure similar to that of another one, but differing from it in respect of one or more components, such as one or more atoms, functional groups, or substructures, etc. Functional analogs are compounds that has similar physical, chemical, biochemical, or pharmacological properties. Functional analogs are not necessarily also structural analogs with a similar chemical structure.

For purposes of the disclosed invention, the term "room temperature" refers to a temperature of from about 20° C. to about 25° C.

DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

Cyclic polymers do not contain end groups,[1] and as a result demonstrate a number of unique physical properties.[2] For example, the density[3], refractive index[4,5], glass-transition temperature,[6] viscoelasticity,[7] reptation[8] and surface properties[9] of cyclic polymers all differ from those of their more common linear analogues. Most of the seminal work that compares linear versus cyclic polymers relies on theory or on experimental work involving a limited set of macrocycles, for example poly(dimethylsiloxane).[10] Despite research in this area for over half a century there still remains a lack of knowledge regarding the properties and fundamental behavior of cyclic analogues of important commercial polymers, primarily because of their difficult syntheses and purification.

Ring closing[11,12] of large chains is one method of creating cyclic polymers, but requires dilute conditions to be efficient, and thus precludes large-scale synthesis. Competing intermolecular cross-coupling reactions that result in chain extension instead of cyclization also inevitably lead to linear impurities. As even trace non-cyclic impurities can have pronounced effects on the physical properties of a sample,[13,14] exhaustive purification to remove linear by-products,[15] biphasic conditions,[16] or preparatory-scale gel permeation chromatography (GPC) is often necessary.

Ring-expansion polymerization is another method for accessing cyclic polymers.[17] The mechanism involves the insertion of a monomer into a growing ring, such as at a metal-carbon or metal-oxygen bond. This method does not suffer the same low-concentration limitations as ring closure, which makes it an appealing approach for the synthesis of cyclic polymers of high molecular mass.[18] A dibutyltin catalyst developed by Hans and Kricheldorf[9] was one of the first examples of this type of polymerization. Although an effective example of the synthesis of macrocyclic polymers, the dibutyltin catalyst is limited to the polymerization of lactones. More-recent catalysts[18, 20-22] show promising results, but again each catalyst is tuned to a specific monomer. Ring-expansion olefin metathesis polymerization (REMP), introduced by Grubbs and co-workers,[23, 24] is another approach to producing cyclic polymers efficiently. Although the ring-expansion method of creating cyclic polymers is much preferred to the post-polymerization processing required in ring closure for large-scale synthesis, ring expansion is not without limitations. As an example, in REMP backbiting occurs as the degree of polymerization increases,[25] and trace linear alkenes need to be removed from the monomer feedstock.[26]

Additionally, REMP catalyst systems require a cyclic monomer, for example, cyclooctene and its derivatives. It would be beneficial to employ more readily available and cheaper substrates. Thus, a longstanding general challenge in polymer chemistry is to synthesize cyclic polymers efficiently, with diverse compositions, high purity, high molecular weights, and from readily available and inexpensive monomers.

Conjugated macrocyclic polyenes are an area of considerable interest. Large conjugated macrocyclic materials can be useful in host-guest chemistry[27] and in the self-assembly of more-complicated one-, two- and three-dimensional structures.[28] The ability of these macrocycles to self-assemble via TC-TC interactions can lead to a variety of unusual structures, and thus physical properties.[29] A longstanding general challenge in both work that involves conjugated macrocycles and polymer chemistry is an efficient synthesis that allows for diverse compositions, ensures high purity and high molecular masses and can be made from readily available and inexpensive monomers.[30]

U.S. International Patent Application No. PCT/US2012/065841, filed Nov. 19, 2012 discloses the preparation of tridentate pincer ligand supported metal complexes, which are either trianionic pincer ligand supported metal-alkylidyne complexes or tetra-anionic pincer ligand supported metallacycloalkylene complexes that are formed from trianionic pincer ligand supported metal-alkylidyne complexes and alkynes. A trianionic pincer ligand supported metal-alkylidyne complex can be used as a polymerization pre-catalyst to polymerize an alkyne.

A trianionic pincer ligand supported metal-alkylidyne complex has the following structure:

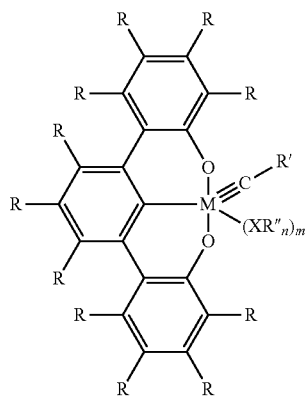

(III)

where: R is, independently, H, methyl, ethyl, n-propyl, i-propyl, n-butyl, i-butyl t-butyl, or larger alkyl, or any other substituent that does not inhibit formation of the metal-alkylidyne M—C triple bond of the trianionic pincer ligand supported metal-alkylidyne complex; R' is methyl, ethyl, n-propyl, i-propyl, n-butyl, i-butyl, t-butyl, $C_5$-$C_{22}$ alkyl, phenyl, naphthyl, or $C_{13}$-$C_{22}$ aryl; X, independently, can be O, N, S, P, or Se; R", independently, is methyl, ethyl, n-propyl, i-propyl, n-butyl, i-butyl, t-butyl, $C_5$-$C_{22}$, phenyl, naphthyl, $C_{13}$-$C_{22}$ aryl, or two R" is a $C_4$-$C_6$ alkylene combined with a single X as a heterocycle; n is 1 to 3 depending on X; m is 1 to 2; and M is a group 5-7 transition metal.

A tetra-anionic pincer-ligand supported metallacycloalkylene complex has the following structure:

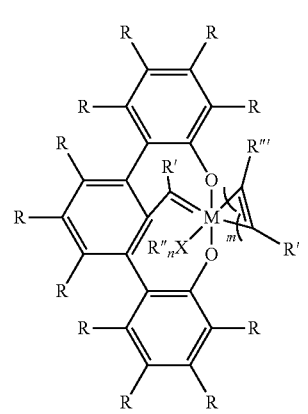

(IV)

where: R is, independently, H, methyl, ethyl, n-propyl, i-propyl, n-butyl, i-butyl, t-butyl, or larger alkyl, or any other substituent that does not inhibit formation of the tetraanionic pincer-ligand supported metallacycloalkylene; R' is, independently, methyl, ethyl, n-propyl, i-propyl, n-butyl, i-butyl, t-butyl, $C_5$-$C_{22}$ alkyl, phenyl, naphthyl, $C_{13}$-$C_{22}$ aryl, substituted aryl, or trimethylsilyl; R'" is H or methyl; X, independently, is O, N, S, P, or Se; R", independently, can be methyl, ethyl, n-propyl, i-propyl, n-butyl, i-butyl, t-butyl, $C_5$-$C_{22}$, phenyl, naphthyl, $C_{13}$-$C_{22}$ aryl, or two R" are $C_4$-$C_6$ alkylene combined with a single X as a heterocycle; n is 1 to 3 depending on X; m is 1 to 2; and M is a group 5-7 transition metal.

As shown in FIG. 1, complex 1 is a precatalyst and is converted into complexes 2 and 3, with complex 2 being the more-active alkyne-polymerization catalyst. In an original report,[32] complex 2 is demonstrated to be able to polymerize a wide variety of alkynes; however, the topology of the polymers is not addressed. In addition, the synthesis of complex 2 proved inefficient, as the less active complex 3 forms in a 33% yield. Another drawback in the original report is that complexes 2 and 3 instantaneously react with any excess phenylacetylene, which consumes the catalyst, reduces the yield and requires an additional purification step. The synthesis disclosed herein provides a solution to this catalyst-preparation problem in the original report. Treating complex 1 with excess 3,3-dimethyl-1-butyne, as opposed to phenylacetylene, complex 4, a catalyst, forms exclusively in a quantitative isolable yield (FIG. 1). As shown in FIG. 1, treating complex 1 with phenylacetylene leads to complexes 2 and 3 in a 2:1 ratio and requires purification and separation procedures. Complex 3 exhibits a low activity and is typically discarded, which thus educes the overall catalyst yield. An improved synthesis involves treating complex 1 with tert-butylacetylene to provide catalyst 4 exclusively and in 100% yield by simply evaporating to remove the solvent.

As shown in FIG. 1, the preparation of the tetra-anionic pincer-ligand supported metallacycloalkylene complex at low temperature with two equivalents of an acetylene monomer gives a mixture of products toward polymerization. In an embodiment of the invention, multiple equivalents of the acetylene monomer is included with the trianionic pincer ligand supported metal-alkylidyne complex at room temperature results in a single tetra-anionic pincer-ligand supported metallacycloalkylene complex with two like monomers on the resulting tetra-anionic pincer-ligand supported metallacycloalkylene complex, as indicated in Equation 1, below.

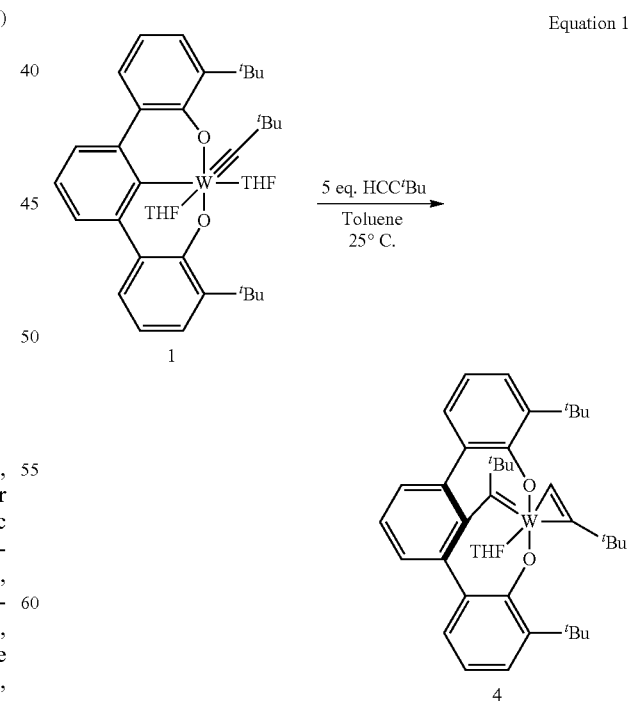

Equation 1

A trianionic pincer ligand supported metal-alkylidyne complex or a tetraanionic pincer ligand supported metallacyclopropene complex can be used as a polymerization catalyst for the polymerization of alkynes using. The poly(alkyne)s prepared by this method can display one or more geometries across the resulting double bonds of the poly(alkyne) backbone. The all cis alkylene chain, indicated by Equation 2, is for illustrative purposes only, and is not intended to suggest the geometry to be expected upon polymerization of all possible monomers, using all possible trianionic pincer ligand supported metal-alkylidyne complexes, or under any set of reaction conditions. The polymerization reaction occurs upon combining the trianionic pincer ligand supported metal-alkylidyne complex to an alkyne monomer, in a fluid state, which can be in solution. The alkyne can be unsubstituted, monosubstituted, or disubstituted. The trianionic pincer ligand supported metal-alkylidyne complex can be a neutral complex or an anion of a salt when employed with a strong electrophile, such as methyl triflate. The polymerization can be carried out at relatively mild conditions, for example, ambient temperatures at dry conditions under an inert atmosphere. The polymerization can occur with a large turnover of monomer per catalyst, a high degree of polymerization, and a high yield of polymer. As would be expected by those skilled in the art, the rate of polymerization and the practical conversion varies with the nature of the monomer, catalyst and conditions for the polymerization. In an embodiment of the invention, the resulting poly(alkyne) can be a cyclic polymer.

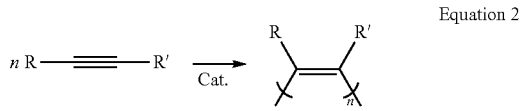

Equation 2

A combination of nuclear magnetic resonance (NMR) spectroscopy, combustion analysis and solid-state X-ray characterization served to identify unambiguously the composition of complex 4. Three singlets in the $^1$H NMR spectrum ($C_6D_6$) of complex 4 are attributable to the alkylidene $^t$Bu, the pincer $^t$Bu and the coordinated acetylene $^t$Bu groups in a 1:2:1 ratio at 0.90, 1.20 and 1.66 ppm, respectively. A singlet at 11.66 ppm corresponds to the terminal proton attached to the $\eta^2$-bound alkyne. In the 13C{$^1$H} NMR spectrum, the alkylidene carbon appears at 268.8 ppm, consistent with known pincer-supported alkylidene complexes.[33]

Figure 2:
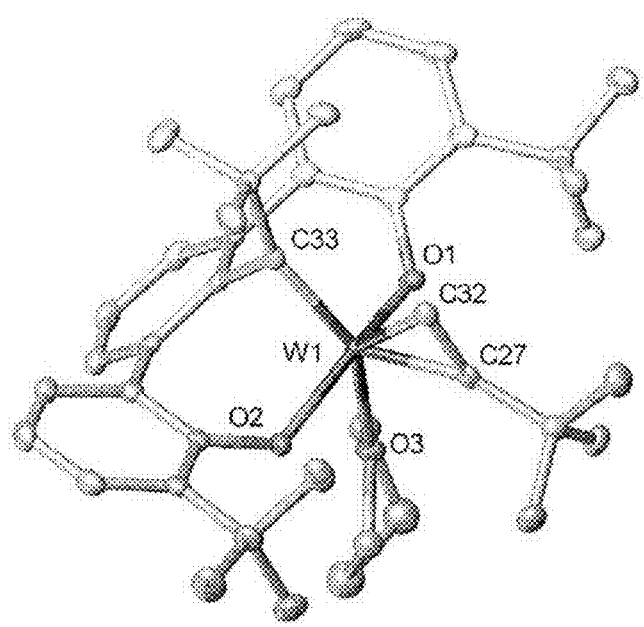
FIG. 2 is a molecular structure of complex 4, according to an embodiment of the disclosed invention.

FIG. 2 shows the molecular structure of complex 4 with ellipsoids drawn at the 50% probability level and disordered THF atoms and lattice solvent molecule (pentane) removed for clarity. FIG. 2 depicts the results of a single-crystal X-ray diffraction experiment performed on crystals that deposit with the slow evaporation of a concentrated solution of complex 4 in pentane. The solid-state structure confirms that the alkylidyne present in complex 1 undergoes a formal reductive migratory insertion into the W-arene bond of the pincer, a particularly rare transformation. In the solid state, complex 4 is pseudo $C_s$, symmetric and contains a W(IV) ion in a non-standard polyhedral geometry. Complex 4 contains a tetraanionic pincer ligand that comprises two phenolates and an alkylidene connection. The phenolate O atoms span the trans positions with an O1-W1-O2 bond angle of 152.37(6)°. The coordinated THF experiences a strong trans influence from the tungstenalkylidene, evidenced by a long W1-O3 bond of 2.328(1) Å, and is labile. For comparison, the THF ligands in 1 are labile and also have long W—O bonds (2.473(2) Å and 2.177(2) Å), with the longest being trans to the alkylidyne. The C32-C27 distance (1.312(4) Å) is significantly elongated from a typical C≡C bond length of 1.21 Å, and is better represented as a double bond and thus the resonance form of a metallacyclopropene.

In the case of ring-expansion polymerization, it is common that even small changes to the metal complex can cause large differences in activity.[31] Fortunately, complex 4 maintains the remarkable high activity observed for catalyst 2. Loading complexes 2 or 3, or the new complex 4, in a 10,000:1 phenylacetylene-1o-catalyst ratio in 2 ml of toluene results in polymerization and a product we now understand to be cyclic poly(phenylacetylene). In the first two minutes of polymerization, 2 averages $6.89 \times 10^6$ g mol$^{-1}$ h$^{-1}$, 3 averages $4.39 \times 10^6$ g mol$^{-1}$ h$^{-1}$, but incredibly 4 averages $9.00 \times 10^6$ g mol$^{-1}$ h$^{-1}$. Not only does complex 4 have excellent activity, it achieves complete conversion under these conditions with a turnover number of ~10,000 after 22 minutes. This remarkable activity is maintained on scale up; submitting complex 4 to 2 ml of phenylacetylene in 20 ml of toluene in a monomer-to-catalyst ratio of 5,000:1 and in one of 10,000:1 results in 96% (1.79 g) and 83% (1.54 g), respectively. The catalyst is tolerant to a variety of functionalized acetylenes, such as ethers, halides and disubstituted acetylenes, although all have effects on the polymerization activity and molecular masses. Achievable molecular masses for phenylacetylene ranged from 8,000 to 130,000 Da.

The polymerization carried out in the presence of styrene or excess TEMPO (2,2,6,6-tetramethyl-1-piperidinyloxy), a radical trap, does not alter or inhibit the polymerization of phenylacetylene, which rules out a radical mechanism.

Several common methods exist that provide compelling supportive evidence for a cyclic topology when compared with an identical linear analogue. Cyclic polymers have a smaller hydrodynamic volume and thus longer elution time by GPC compared with the linear analogues. Also, static and dynamic light-scattering (SLS and DLS, respectively) techniques can confirm that cyclic polymers have smaller particle radii than those of the linear equivalents. Calculations indicate the root mean square (r.m.s.) radius of gyration $((R_g^2)^{0.5})$ of a cyclic polymer is half that of the same polymer in a linear topology.[35] In some cases, it is possible to open the resulting macrocycle through bond cleavage, which results in a linear topology and a subsequent change in physical properties.[23] Linear poly(phenylacetylene) synthesized using (acetylacetonato) (1,5-cyclooctadiene)rhodium(1) (acac(Rh(1)cod))[36,37] as a catalyst provides a comparison with the cyclic polymers produced by complex 4, and by matching molecular masses and polydispersities (PDIs), any change in physical properties observed is evidence for a difference in topology. Using DLS and SLS techniques, the hydrodynamic radius ($R_H$) and r.m.s. radius of gyration $((R_g^2)^{0.5})$ were determined for the linear and cyclic polymers. It is well understood that the ratio of $R_{Hcyclic}/R_{Hlinear}=0.9$[38] and $(R_g^2)_{cyclic}/(R_g^2)_{linear}=0.5$.[35]

Table 1 lists the experimental values of $R_H$ and $R_g$ for the cyclic and linear polymers. With little doubt, the experimentally determined ratios clearly support that the polymers produced with catalyst 4 are cyclic. The experimental ratios of $R_{Hcyclic}/R_{Hlinear}=0.86(7)$ and $(R_g^2)_{cyclic}/(R_g^2)_{linear}=0.53(6)$ clearly indicate a close fit with the relationship between a cyclic and a linear sample. Although comparing radii at a single molecular mass is useful, it is important to ensure that the difference is the same over a wide range of molecular masses.

TABLE 1

$M_n$, $M_w/M_n$ and $R_H$ values for molecular-mass matched linear and cyclic poly (phenylacetylene)

| Sample | $M_n$ (absolute) (Da) | $M_w/M_n$ | Radius ($R_H$)* (nm) |
|---|---|---|---|
| Cyclic[†] | 45,600 | 1.95 | 2.21(17) |
| Linear[‡] | 47,300 | 2.22 | 2.58(2) |

*Hydrodynamic radius as measured in toluene at room temperature.
[†]Sample was prepared by the addition of phenylfacetylene to a solution of complex 4 in toluene and quenched after five minutes.
[‡]Sample was prepared by the addition of phenylacetylene to a solution of acac (Rh(1)cod) in THF and quenched after three hours.[37]

Cyclic poly(phenylacetylene), an unprecedented cyclic polymer, is now accessible in high yield from the polymerization of inexpensive phenylacetylene. By treating the alkylidyne complex 1 with 3,3-dimethyl-1-butyne rather than phenylacetylene, the active alkyne polymerization complex 4 forms in quantitative isolable yield. The improved catalyst preparation is beneficial, and equally important is that complex 4 retains a high activity for the ring-expansion polymerization of phenylacetylene. A combined multiexperiment approach provides unambiguous evidence of a cyclic topology as compared with authentic linear samples. DLS and SLS techniques provide ($Rg^2$) and RH ratios of cyclic versus linear samples that clearly indicate a difference in topology. Complementing the light-scattering data, intrinsic viscosities ((17)) measured over a wide range of molecular masses clearly demonstrate the topological relationship between authentic linear samples and cyclic samples produced by catalyst 4. Ring opening of partially hydrogenated samples of cyclic poly(phenylacetylene) leads to polymers that exhibit larger hydrodynamic volumes, as determined by GPC. Hydrogenating cyclic poly(phenylacetylene) provides cyclic polystyrene that exhibits GPC elution times significantly longer than those of authentic samples of linear poly(styrene) with similar absolute molecular masses. Complex 4, which features the unique tetraanionic pincer ligand, now enables access to a new class of polymers from commercially available alkynes, and the high activity ($9.0 \times 10^6$ g $mol^{-1}$ $h^{-1}$) will permit access to large quantities of high-purity conjugated cyclic polymers.

According to the disclosed embodiments, once cyclic polymers are synthesized by employing a tungsten catalyst that efficiently polymerizes common alkynes to form macrocyclic polyenes, unsaturated macrocyclic polyenes can be further hydrogenated to form saturated cyclic polymers. In particular, the disclosed embodiments provide branched cyclic polyolefins synthesized via the use of complex 4 as a catalyst.

Figure 3:
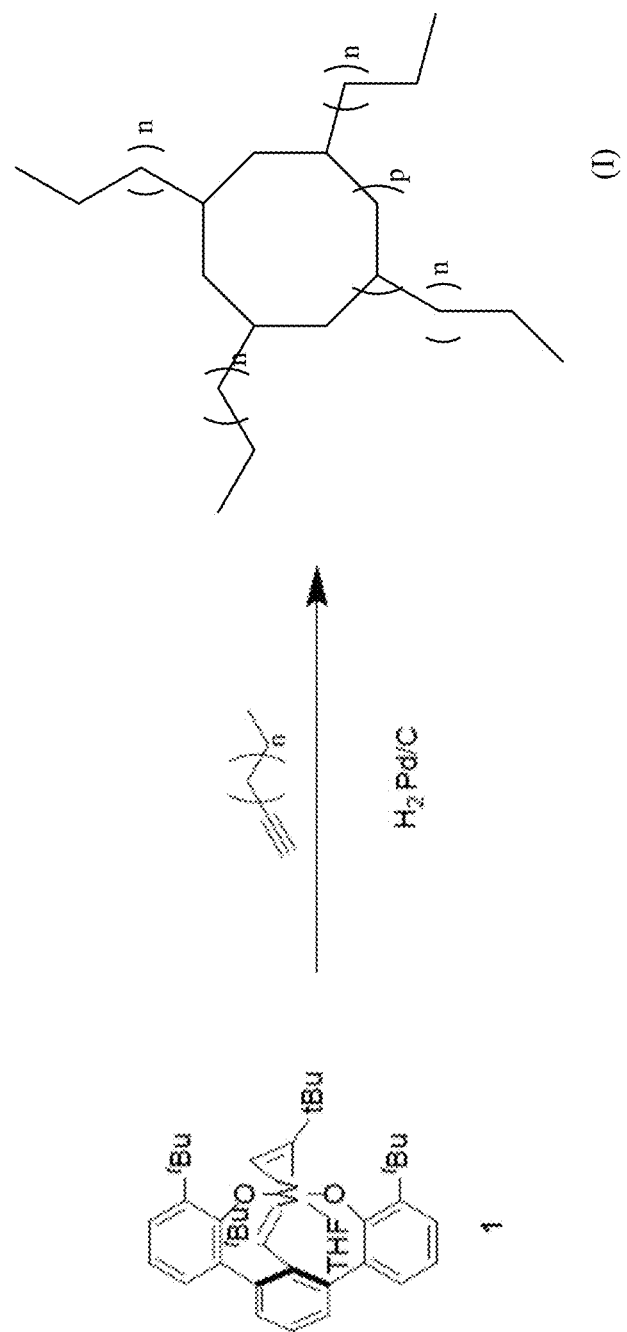
FIG. 3 shows a scheme for synthesis of a saturated cyclic polymer, according to an embodiment of the disclosed invention.

FIG. 3 illustrates a scheme for synthesis of a saturated cyclic polymer having the following formula:

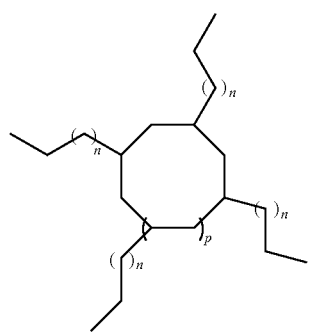

(I)

In formula (I), n varies widely across the different polymers and conditions. The size of the polymer can vary. In some embodiments, n is an integer equal to 2, 4, 7 and 12, and p is any integer greater than or equal to 1, such as 1, 2, 3, etc. According to the disclosed embodiments, long-chained terminal alkynes can be polymerized to produce a polymer. The polymer can be further hydrogenated to produce a "polyolefin" that resembles cyclic low density polyethylene. Alternatively, acetylene and a long-chained alkyne can be copolymerized to introduce "polyethylene" spacer groups between the chains once hydrogenated.

In particular, a saturated cyclic polymer can be produced by hydrogenating an unsaturated cyclic polymer with a hydrogenation catalyst such as palladium on carbon (Pd/C). The unsaturated cyclic polymer can be produced by mixing alkyne monomers with a catalyst or a precatalyst, thereby allowing the alkyne monomers to incorporate into an unsaturated cyclic polymer. The catalyst or precatalyst can be selected from a group consisting of a trianionic pincer ligand supported metalalkylidyne complex, a tetra-anionic pincer-ligand supported metal-alkyne, and a tetra-anionic pincer-ligand supported metallacycloalkylene complex.

Figure 4:
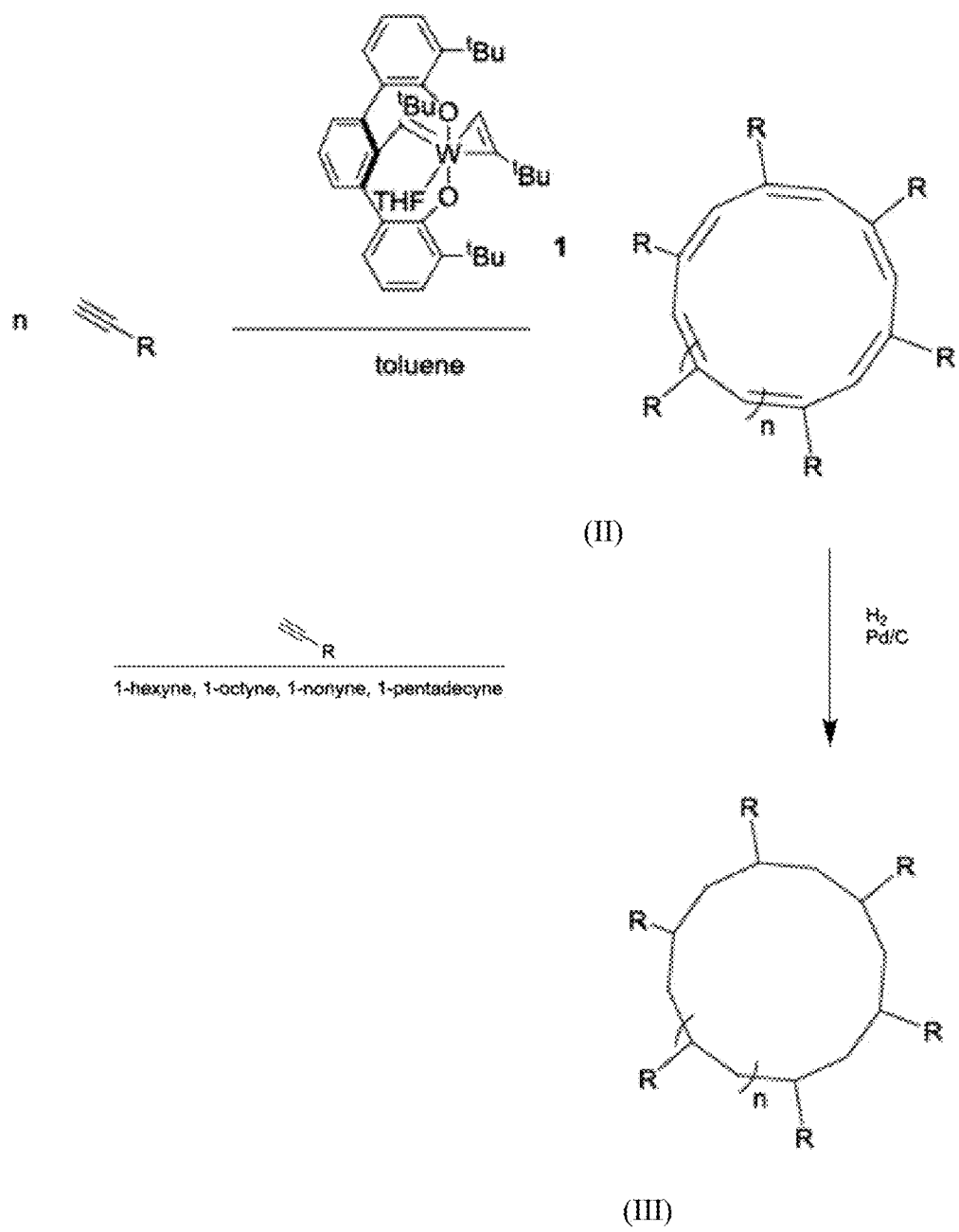
FIG. 4 shows a scheme for synthesis of a saturated cyclic homopolymer of 1-hexyne, 1-octyne, 1-nonyne, or 1-pentadecyne, according to an embodiment of the disclosed invention.

In an embodiment, an alkyne monomer selected from a group consisting of 1-hexyne, 1-octyne, 1-nonyne, and 1-pentadecyne is used to synthesize a saturated cyclic homopolymer. FIG. 4 shows a scheme for synthesis of the saturated cyclic homopolymer of 1-hexyne, 1-octyne, 1-nonyne, or 1-pentadecyne, according to an embodiment of the disclosed invention. As shown in FIG. 4, a saturated cyclic homopolymer is produced by hydrogenating an unsaturated cyclic polymer with a hydrogenation catalyst. The hydrogenation catalyst can be palladium on carbon (Pd/C), Crabtree's catalyst ($[Ir(COD)(py)(PCy_3)]^+[PF_6]^-$, where COD=cyclooctatetraene, py=pyridine, and Cy=cyclohexane), etc. The unsaturated cyclic polymer can be produced by mixing a single type of alkyne monomers with a catalyst (complex 4), thereby allowing the single type of alkyne monomers to form into an unsaturated cyclic homopolymer, which has the following structural formula:

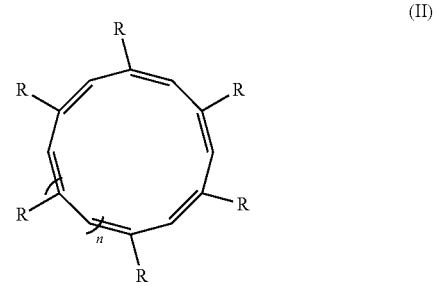

(II)

wherein: R is n-butyl, n-hexyl, n-heptyl, n-tetradecane; n varies widely across the different polymers and conditions and can be a value of 1 or more than 1.

Upon hydrogenation of the unsaturated cyclic polymer (formula II), a saturated cyclic homopolymer is produced. The saturated cyclic homopolymer has the following structural formula:

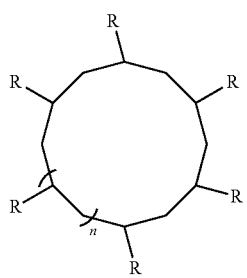

(III)

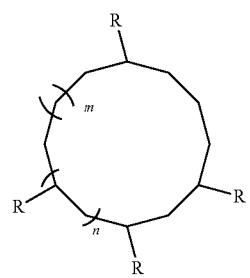

(V)

wherein: R is n-butyl, n-hexyl, n-heptyl, n-tetradecane; n varies widely across the different polymers and conditions and can be a value of 1 or more than 1. The saturated cyclic homopolymer incorporates a singly type of monomers selected from the group consisting of 1-hexyne, 1-octyne, 1-nonyne, and 1-pentadecyne. In an embodiment, the saturated cyclic homopolymer is further purified. A relative purity of the saturated cyclic homopolymer determined by a nuclear magnetic resonance spectroscopy (NMR) analysis can be about 75% to about 95%. In one embodiment, a relative purity determined by an NMR analysis can be more than about 95%. In an alternative embodiment, a relative purity determined by an NMR analysis can be 99%.

Figure 5:
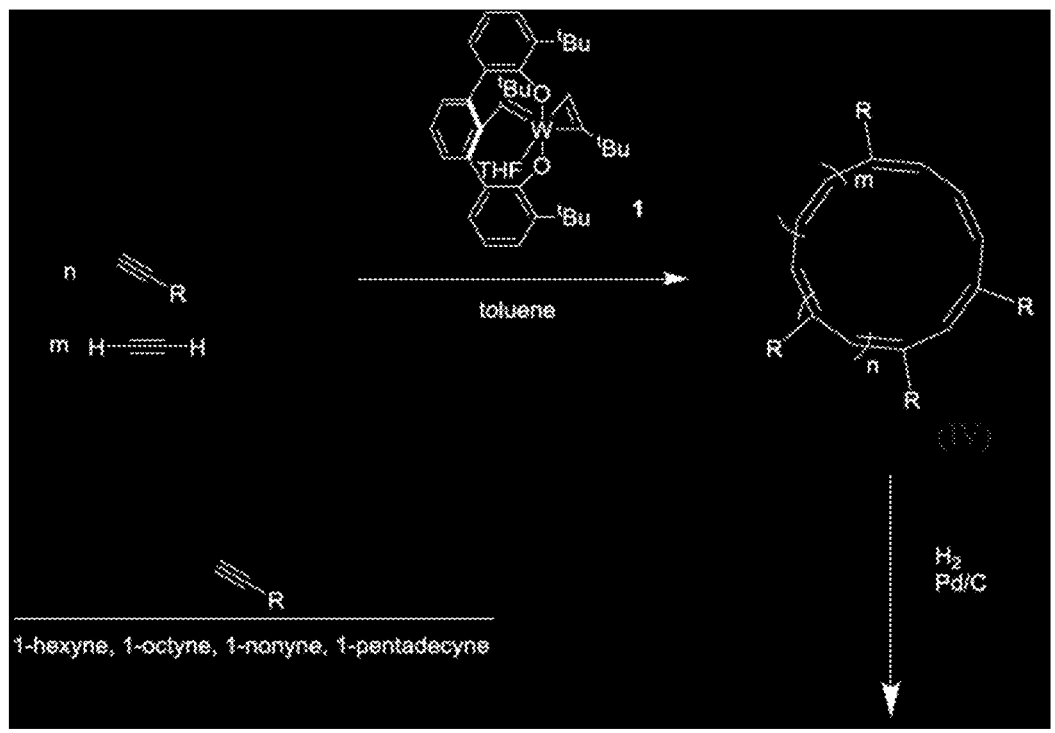
FIG. 5 shows a scheme for synthesis of a saturated cyclic copolymer of 1-hexyne, 1-octyne, 1-nonyne, or 1-pentadecyne with acetylene, according to an embodiment of the disclosed invention.
Figure 5:
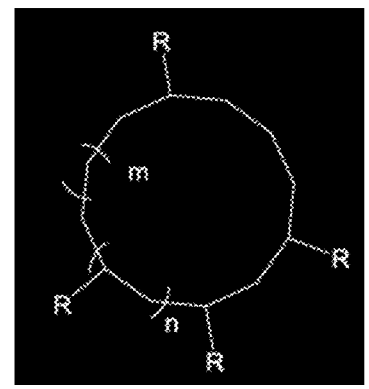

In an embodiment, a saturated cyclic copolymer is provided. The saturated cyclic copolymer is synthesized using acetylene and a second alkyne monomer as comonomers. FIG. 5 shows a scheme for synthesis of saturated cyclic copolymers using acetylene and a second alkyne monomer, according to an embodiment of the disclosed invention. The second alkyne monomer is selected from the group consisting of 1-hexyne, 1-octyne, 1-nonyne, and 1-pentadecyne. As shown in FIG. 5, a saturated cyclic copolymer can be produced by hydrogenating an unsaturated cyclic copolymer with a hydrogenation catalyst such as palladium on carbon (Pd/C). The unsaturated cyclic polymer can be produced by mixing acetylene and a second alkyne monomer, such as 1-hexyne, 1-octyne, 1-nonyne, or 1-pentadecyne, with a catalyst, thereby allowing the acetylene and the second alkyne to incorporate into an unsaturated cyclic copolymer, which has the following structural formula:

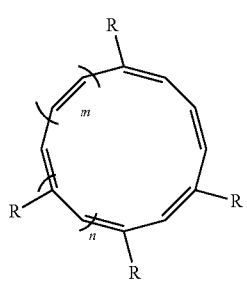

(IV)

In structural formula (IV), R can be n-butyl, n-hexyl, n-heptyl, or n-tetradecane. The values for "n" and "m" are varied and the ratio of n/m can be a number varied from 0 to 1. In some embodiments, n is an integer greater than or equal to 1 and m is an integer greater than or equal to 1.

Hydrogenation of the unsaturated cyclic copolymer results in a saturated cyclic copolymer, which has the following structure structural formula:

In structural formula (V), "R" can be n-butyl, n-hexyl, n-heptyl, or n-tetradecane. The values for "n" and "m" are varied. The ratio of n/m can be a number varied from 0 to 1. In some embodiments, n is an integer greater than or equal to 1 and m is an integer greater than or equal to 1. The size of the polymer can vary.

Acetylene and the second alkyne monomer can be randomly incorporated in the saturated cyclic copolymer at a variable ratio. As a result, a ratio of comonomer incorporation, which is incorporated acetylene/incorporated second alkyne monomer, in the saturated cyclic copolymer varies. For example, in an alternative embodiment, in a saturated cyclic copolymer where R is hexyl, a ratio of incorporated acetylene to incorporated second alkyne monomer is about 59:41, 47:53, or 34:66. It should be appreciated that where R is hexyl, the ratio of incorporated acetylene to incorporated second alkyne monomer has the incorporated acetylene between 34 and 59 and the second alkyne monomer between 41 and 66. In another alternative embodiment, in a saturated cyclic copolymer where R is tetradecane, a ratio of incorporated acetylene to incorporated second alkyne monomer is about 15:85. In an alternative embodiment, in a saturated cyclic copolymer where R is heptyl, a ratio of incorporated acetylene to incorporated second alkyne monomer is about 43:57 or about 15:85. It should be appreciated that where R is heptyl, and a ratio of incorporated acetylene to incorporated second alkyne monomer has the incorporated acetylene between 15 and 43 and the second alkyne monomer between 57 and 85.

The saturated cyclic copolymer can be further purified. In an embodiment, a relative purity of the saturated cyclic copolymer determined by a nuclear magnetic resonance spectroscopy (NMR) analysis is about 75% to about 95%. In one embodiment, a relative purity determined by an NMR analysis can be more than about 95%. In an alternative embodiment, a relative purity determined by an NMR analysis can be 99%.

These disclosed saturated cyclic polymers have different and potentially interesting rheological and viscometric properties. They can be useful as additives to known polyolefins.

The disclosed invention is further defined in the following Examples. It should be understood that these Examples are given by way of illustration only. From the above discussion and these Examples, one skilled in the art can ascertain the essential characteristics of embodiments of the disclosed invention. Without departing from the spirit and scope thereof, one skilled in the art can make various changes and modifications of the invention to adapt it to various usages and conditions. All publications, including patents and non-patent literature, referred to in this specification are expressly incorporated by reference herein.

EXAMPLES

Example 1

Methods
Synthesis of Complex 4 ([$^t$BuOCHO]W≡C(CH$_3$)3(O$^t$Bu)(THF))

In a nitrogen filled glovebox, a glass vial equipped with a stir bar was charged with 1 (400 mg, 0.52 mmol) and dissolved in toluene (5.0 mL). 3,3-dimethyl-1-butyne (214 mg, 321 μL, 2.60 mmol) was added via micropipette with stirring. After 5 min, the solvent and residual 3,3-dimethyl-1-butyne were removed in vacuo to yield the light brown solid complex 4 in >99% yield (405 mg, 0.52 mmol), for the reaction indicated in Equation 2, above. The resulting solid was dissolved in minimal pentane and cooled to −35° C. to yield single crystals 10 amenable to X-ray diffraction, where the molecular structure is shown in FIG. 2. $^1$H NMR (500 MHz, C$_7$D$_8$, δ (ppm)): 11.61 (s, 1H, W—CH$_{32}$), 7.41 (d, 2H, Ar—H$_{8,10}$), 7.28 (dd, 2H, ArH$_{3,16}$), 7.26 (t, 1H, Ar—H$_9$), 7.19 (dd, 2H, Ar—H$_{5,14}$), 6.77 (t, 2H, Ar—H$_{4,15}$), 3.60 (t, 4H, THF-H$_{38,41}$), 1.66 (s, 9H, W—C≡C(CH$_3$)$_3$ (H$_{29-31}$)), 1.20 (s, 18H, ligand C(CH$_3$)$_3$ (H$_{20-22,24-26}$)), 1.16 (t, 4H, THF-H$_{39,40}$), 0.90 (s, 9H, W═C(CH$_3$)$_3$ (H$_{35-37}$)). $^{13}$C NMR: 268.8 (s, W═CC(CH$_3$)$_3$ (C$_{33}$)), 213.0 (s, WCCC(CH$_3$)$_3$(C$_{27}$)), 184.0 (s, WCCC(CH$_3$)$_3$(C$_{32}$)), 168.5 (s, C$_{1,18}$), 153.7(s, Ar—C$_{7,11}$), 137.4 (s, Ar—C$_{6,13}$), 137.3 (s, Ar—C$_{2,17}$), 132.5 (s, Ar—C$_{12}$), 130.9 (s, Ar—C$_9$), 129.2(s, Ar—C$_{8,10}$), 128.2 (s, Ar—C$_{3,16}$), 125.7 (s, Ar—C$_{5,14}$), 118.7 (s, Ar—C$_{4,15}$), 71.3 (s, THF-C$_{38,41}$), 46.0 (s, W═CC(CH$_3$)$_3$(C$_{34}$)), 39.2 (s, WCCC(CH$_3$)$_3$(C$_{28}$)), 36.0 (s, W═CC(CH$_3$)$_3$(C$_{35-37}$)), 34.3 (s, ligand C(CH$_3$)$_3$(C$_{19,23}$)), 31.1 (s, WCCC(CH$_3$)$_3$(C$_{29-31}$)), 30.1 (s, ligand C(CH$_3$)$_3$ ($_{C20-22,24-26}$)), 25.00 (s, THF C$_{39,40}$). Anal. Calcd.: C: 63.24% H: 6.99%, Found: C: 63.28%, H: 7.09%.

General Polymerization Procedure

In an inert atmosphere glovebox, toluene (2.0 ml) was added to a glass vial equipped with a stir bar. Phenylacetylene (218 μl, 2.00 mmol) was added via a micropipette with stirring. A stock solution (1 mg ml$^{-1}$) of 4 (157 μl, 0.20 μmol) was added to the stirring solution in one shot to initiate the polymerization. Polymerization was terminated via the addition into tenfold excess of stirring diethyl ether. The resulting polymer samples were isolated via vacuum filtration and the residual solvent was removed in vacuo.

General Procedure for Hydrogenation

In an argon or nitrogen filled glove-box, the polymer to be hydrogenated is dissolved in toluene upon stirring at room temperature for few minutes. To this solution, 100 wt % of Pd/C is added, and the glass vial containing the reaction mixture is capped with a septum. A needle is stick to the septum allowing for atmosphere exchange between the interior of the vial and the exterior, but avoiding solvent spill during hydrogenation. The vial glass is placed inside of a Parr bomb, which is sealed and loaded with H2 up to 800 psi (after flushing H2 twice before achieving the desired pressure). The reaction system is heated up to 90° C. and allowed to stir for 7 days. The pressure is released and the solutions of hydrogenated polymers are filtered through celite, followed by solvent removal under reduced pressure. Samples were dried overnight under vacuum.

Example 2

Cyclic Polyolefins

Cyclic polymers are known to have significantly different properties from their linear analogues. While a lot of attention has turned to these polymers and their properties, their synthesis in large scale still demonstrates a challenge and limits their applications.

In 2013, the Veige group developed the most active catalyst for alkyne polymerization, and its proposed mechanism indicated a cyclic topology for the resulting polymers.[32] A recent work published by Veige et al.[31] introduced a variation of this catalyst, which stands right behind it as the second most active alkyne polymerization catalyst, but with a much more advantageous and economic synthesis. This work also confirmed the assignment of the generated polymers as cyclic by comparing properties such as hydrodynamic volume, viscosity and radius of gyration, with their linear counterparts.

Low density polyethylene (LDPE) is among the most used polymers, finding applications that range from plastic bags and packaging to tubing and electrical cables, reaching a worldwide market of about US$33 billion in 2013. LDPE and high density polyethylene (HDPE) show very different properties, for instance LDPE has less hardness and strength than HDPE, but it is more ductile. These differences lead to distinct properties, employed in various industry fields. An important point to be highlighted is that both commercial LDPE and HDPE are linear. The idea of being able to synthesize cyclic LDPE in larger scale and evaluate the new properties that can rise from this polymer is very attractive.

General Considerations

Toluene used was dried using a GlassContour drying column. 1H and 13C NMR spectra were obtained on Varian INOVA spectrometer, operating at 500 MHz for proton. Chemical shifts, reported in δ (ppm), were referenced on the solvent, on the TMS scale for 1H and 13C. Monomers 1-nonyne, 1-pentadecyne, 1-hexyne and 1-octyne were dried over 4 Å molecular sieves, submitted to 3-cycles of freeze-pump-thaw, and brought to a glove-box of either nitrogen or argon atmosphere. Acetylene gas was purchased from Air Gas, and purified by passing through a trap of chloroform and liquid nitrogen.

General Procedure for the Synthesis of Homopolymers

In this example, homopolymers are synthesized using the linear alkynes (1-hexyne, 1-octyne, 1-nonyne, 1-pentadecyne).

In a nitrogen or argon filled glove box, the desired monomer is dissolved in toluene in a 50 mL round bottom flask equipped with a stirring bar. A solution of catalyst in toluene is prepared and added at one shot to the monomer solution, with the volume varying according to the number of equivalents necessary. Instantaneous color change and increase in viscosity is observed for all polymerizations. After stirring for certain periods of time, the polymers are brought out of the glove-box and added to stirring methanol. The precipitated polymers are isolated by filtration and dried under vacuum overnight.

Exemplary results for the synthesis of homopolymers are summarized on Table 2. As shown in Table 2, the homopolymerization of all the linear alkynes provided good to very good yields of polymer when using 1:5000 monomer to catalyst ratio. The polymerization was conducted in toluene at room temperature. When a toluene solution of the catalyst was added to a toluene solution of the monomer the transparent solution turns instantaneously to bright orange. A change in viscosity was also observed. The polymers were precipitated by slow addition to stirring methanol. All of the homopolymer synthesized are orange tacky solids.

TABLE 2

Exemplary conditions for the synthesis of homopolymers 1-hexyne, 1-octyne, 1-nonyne, and 1-pentadecyne.

| Monomer | Batch Name | Monomer/Catalyst ratio | Mass of Monomer (g) | Total Volume (mL) | Reaction Time (min) | Yield (%) | Polymer Color |
|---|---|---|---|---|---|---|---|
| 1-hexyne | Hex-1 | 5000:1 | 2.0 | 30 | 5 | 94 | orange |
| 1-octyne | Oct-1 | 5000:1 | 2.0 | 15 | 5 | 80 | orange |
| 1-nonyne | Non-1 | 5000:1 | 2.0 | 50 | 5 | 94 | orange |
| 1-pentadecyne | Ptd-1 | 5000:1 | 2.0 | 50 | 5 | 83 | orange |

General Procedure for the Synthesis of Copolymers

In a nitrogen or argon filled glove box, the desired monomer is dissolved in toluene in a 50 mL round bottom flask equipped with a stirring bar. The reaction flask is sealed using a rubber septum and taken outside of the glove-box. A toluene solution of catalyst is prepared inside the glove-box, transferred to a gas-tight Hamilton syringe, and brought outside along with the reaction flask. Acetylene is bubbled through the solution of the monomer for 3 minutes. After this period, the flow of acetylene is suspended but a balloon filled with this gas remains connected to the system to provide further acetylene if necessary. The toluene solution of the catalyst is then added in one shot via syringe to the monomer solution, with the volume varying according to the number of equivalents necessary. The ratio of monomer to catalyst is based on the amount of the monomers other than acetylene. Instantaneous color change and increase in viscosity is observed for all polymerizations. After stirring for certain periods of time, the polymers are added to stirring degassed methanol, under argon flow. The precipitated polymers are isolated by filtration, dried under vacuum overnight, and stored under inert atmosphere.

The copolymers are in general slightly soluble in toluene. A drop in the yield of the copolymers is observed when compared to homopolymers. The lower yields may be due to the low solubility of chains that would be mainly composed of acetylene. Such polymer chains containing the active catalyst would precipitate before incorporating any of the long-chained monomer. In some cases, a larger amount of solvent is used and the resulting copolymers appear to have a higher incorporation of acetylene accompanied by a drop in yield. For copolymers synthesized using identical procedures, some differences are observed, such as yield and acetylene incorporation. The results again indicate that copolymers with higher acetylene incorporation are obtained in lower yields. The results related to the copolymers synthesized are summarized in Table 3.

TABLE 3

Exemplary conditions for the synthesis of copolymers of acetylene with one of the following: 1-hexyne, 1-octyne, 1-nonyne, and 1-pentadecyne.

| Monomer | Batch Name | Monomer/Catalyst ratio | Mass of Monomer (g) | Total Volume (mL) | Reaction Time (min) | Yield (%) | Polymer Color |
|---|---|---|---|---|---|---|---|
| Acetylene/1-hexyne | Ac-Hex-1 | 5000:1 | 1 | 10 | 5 | 20 | purple |
| Acetylene/1-octyne | Ac-oct-1 | 10000:1 | 4 | 80 | 10 | 25 | Dark purple |
| Acetylene/1-nonyne | Ac-Non-1 | 5000:1 | 2.0 | 10 | 10 | 40 | dark red |
| Acetylene/1-nonyne | Ac-Non-2 | 5000:1 | 2.0 | 10 | 10 | 20 | dark red |
| Acetylene/1-nonyne | Ac-Non-3 | 5000:1 | 2.0 | 10 | 10 | 62 | dark red |
| Acetylene/1-pentadecyne | Ac-Ptd-1 | 1000:1 | 1.0 | 5 | 5 | 99 | redish brown |
| Acetylene/1-pentadecyne | Ac-Ptd-2 | 5000:1 | 1.0 | 10 | 10 | 17 | dark purple |

The incorporation of the long-chained alkyne into the acetylene can be estimated by integrating the $^1$H NMR olefinic and aliphatic region. Table 4 illustrates an exemplary incorporation in percentages for all the synthesized copolymers.

TABLE 4

Exemplary incorporation of Long-chain Alkyne into polyacetylene.

| Polymer | Long-Chain Alkyne Incorporation percentage |
|---|---|
| Ac-Non-1 | >99% |
| Ac-Non-2 | 57% |
| Ac-Non-3 | 85% |
| Ac-Ptd-1 | 84% |
| Ac-Ptd-2 | 85% |
| Ac-oct-1 | 41% |
| Ac-hex-1 | >99% |

General Procedure for Hydrogenation

In an argon or nitrogen filled glove-box, the polymer to be hydrogenated is dissolved in toluene upon stirring at room temperature for few minutes. To this solution, 100 wt % of Pd/C is added, and the glass vial containing the reaction mixture is capped with a septum. A needle is stick to the septum allowing for atmosphere exchange between the interior of the vial and the exterior, but avoiding solvent spill during hydrogenation. The vial glass is placed inside of a Parr reactor, which is sealed and loaded with H2 up to 800 psi (after flushing H2 twice before achieving the desired pressure). The reaction system is heated up to 90° C. and allowed to stir for 7 days. The pressure is released and the solutions of hydrogenated polymers are filtered through celite, followed by solvent removal under reduced pressure. Samples are dried overnight under vacuum.

Exemplary hydrogenation conditions are shown in following Table 5 and Table 6. Table 5 summarizes the exemplary results obtained for the hydrogenations of the synthesized homopolymers. Table 6 summarizes the exemplary results obtained for the hydrogenations of the synthesized copolymers.

TABLE 5

Exemplary reaction conditions for hydrogenations of Hex-1, Oct-1, Non-1 and Ptd-1.

| Polymer | Batch Name | Catalyst Loading | Temperature (° C.) | Pressure (psi) | Time (days) | Mass of Polymer (g) | Yield (%) | Polymer Color |
|---|---|---|---|---|---|---|---|---|
| Hex-1 | Hex-H-1 | 100 wt % | 90 | 1000 | 7 | 0.500 | 99 | clear |
| Oct-1 | Oct-1-H | 100 wt % | 90 | 1000 | 7 | 0.422 | 60 | Light orange |
| Non-1 | Non-1-H | 100 wt % | 90 | 1000 | 7 | 0.984 | 67 | Light yellow |
| Ptd-1 | Ptd-1-H | 100 wt % | 90 | 1000 | 7 | 0.869 | 74 | Light yellow |

TABLE 6

Exemplary reaction conditions for hydrogenations of Ac-Hex-1, Ac-Oct-1, Ac-Non-1, Ac-Non-3 and Ac-Ptd-1.

| Polymer | Batch Name | Catalyst Loading | Temperature (° C.) | Pressure (psi) | Time (days) | Mass of Polymer (g) | Yield (%) | Polymer Color |
|---|---|---|---|---|---|---|---|---|
| Ac-Hex-1 | Ac-Hex-H-1 | 100 wt % | 90 | 1000 | 7 | 0.168 | 25 | Light yellow |
| Ac-Non-1 | Ac-Non-H-1 | 100 wt % | 90 | 1000 | 7 | 0.700 | 59 | Light yellow |
| Ac-Non-3 | Ac-Non-H-2 | 100 wt % | 90 | 1000 | 7 | 0.680 | 79 | Light yellow |
| Ac-Ptd-1 | Ac-Ptd-H-1 | 100 wt % | 90 | 1000 | 7 | 0.684 | 50 | Light yellow |

The non-hydrogenated copolymers decompose in air. Special care has been taken to store all the polymers under an inert atmosphere, using degassed solvent for quenching and limiting their exposure to oxygen.

NMR Spectroscopic Data for Hydrogenated Polymers

Figure 6:
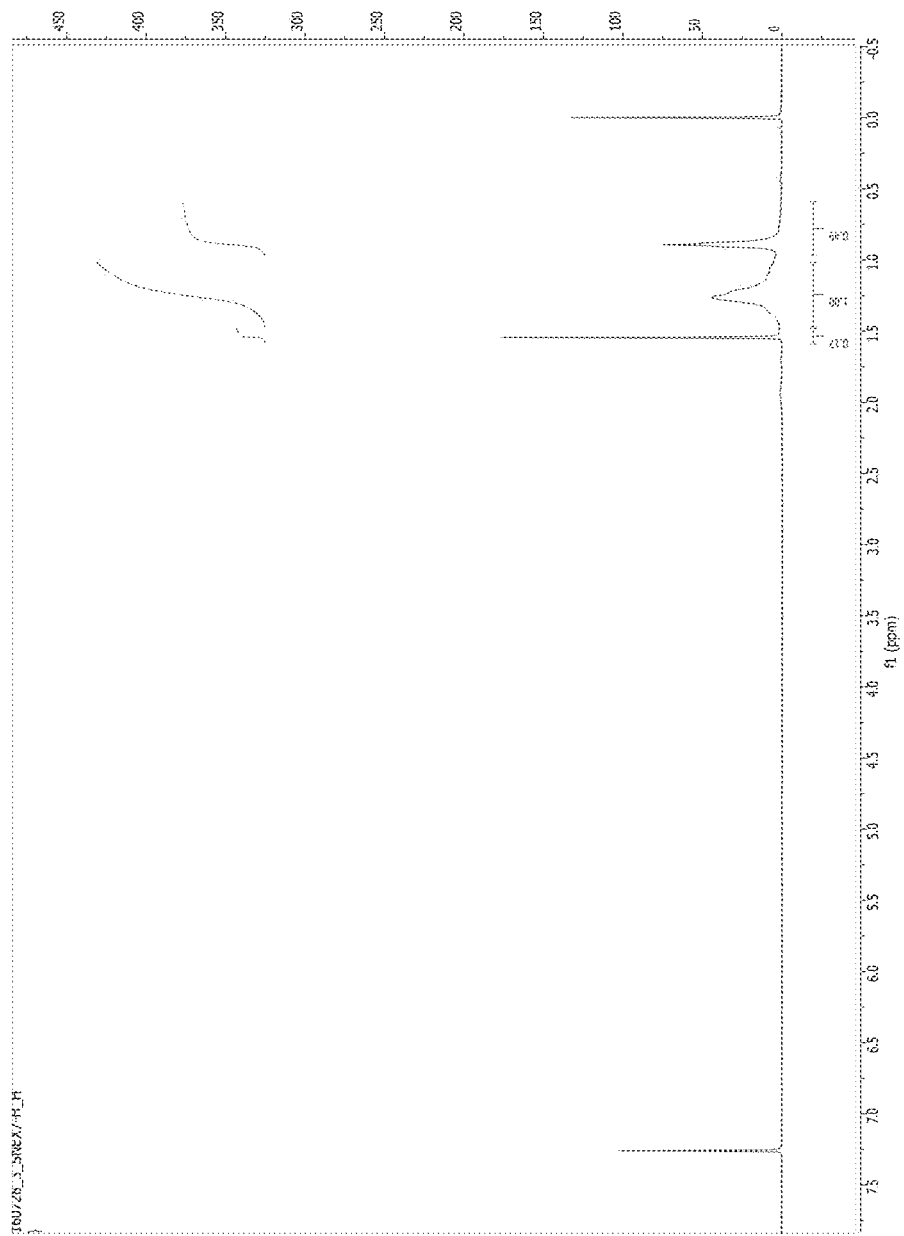
FIG. 6 is an exemplary H NMR spectrum of Hex-1-H in $CDCl_3$ at 25° C., according to an embodiment of the disclosed invention.

NMR spectra were obtained on Varian INOVA 500 MHZ and Varian INOVA2 500 MHz spectrometers. Chemical shifts are reported in δ (ppm). For $^1H$ and $^{13}C$ NMR spectra, the residual solvent peaks were used as an internal reference standard. Samples were prepared by placing solid polymer and an appropriate amount of a deuterated solvent into an NMR tube. Exemplary NMR spectroscopic data for hydrogenated homopolymer Poly(1-Hexyne) is illustrated in FIG. 6. FIG. 6 shows $^1H$ NMR spectrum for of Hex-1-H in $CDCl_3$ at 25° C., according to an embodiment of the disclosed invention.

Figure 7:
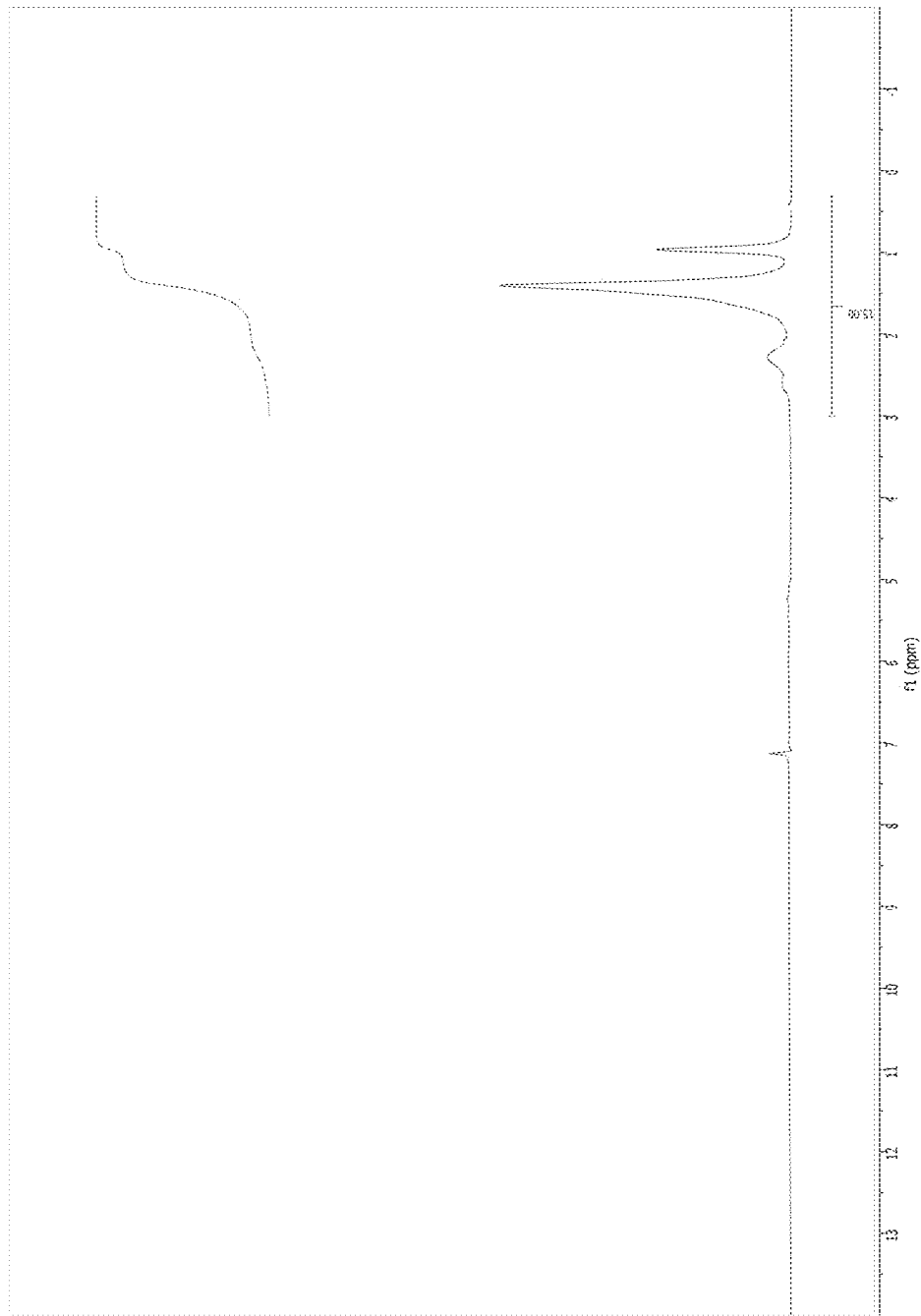
FIG. 7 is an exemplary $^1$H NMR spectrum of poly oct-1 in C6D6 at 25° C., according to an embodiment of the disclosed invention.

Exemplary NMR spectroscopic data for hydrogenated homopolymer Poly(1-octyne) is illustrated in FIG. 7. FIG. 7 shows $^1H$ NMR spectrum of poly oct-1 in C6D6 at 25° C., according to an embodiment of the disclosed invention.

Figure 8:
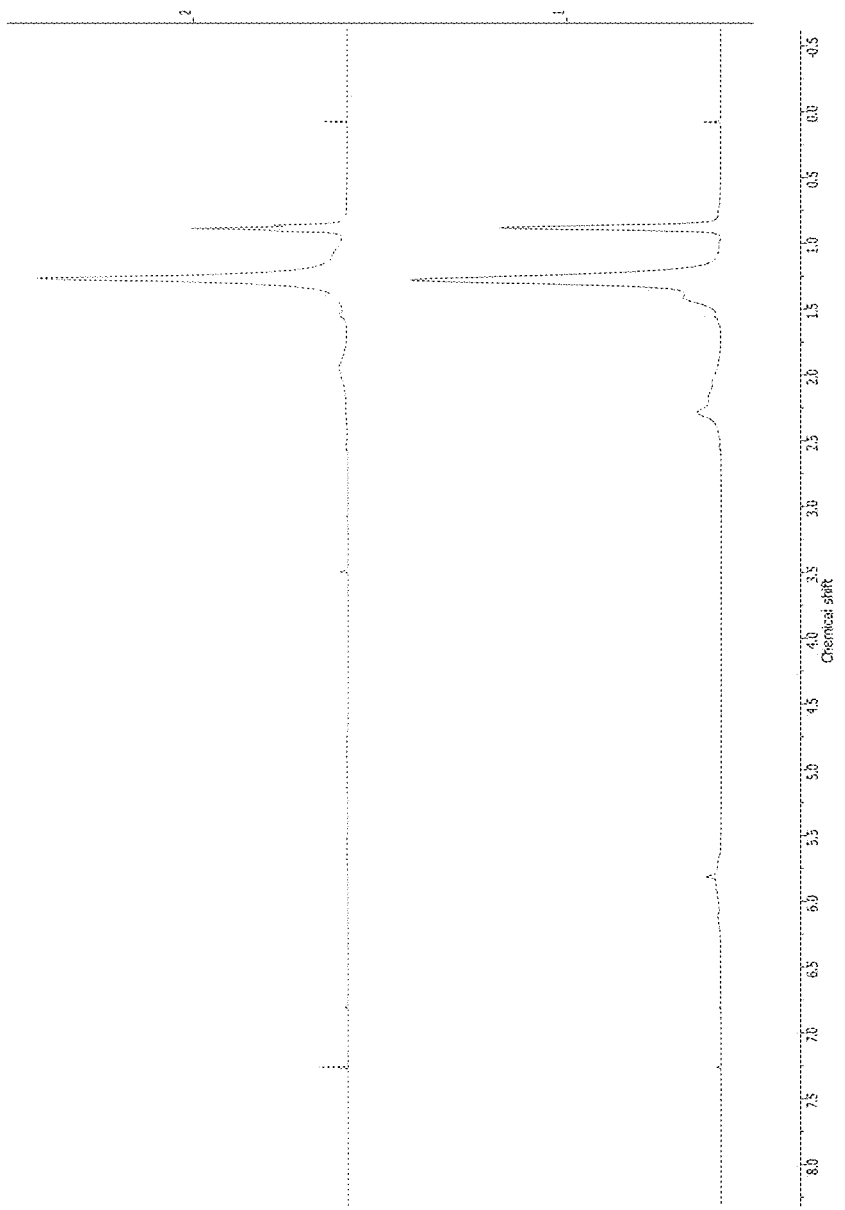
FIG. 8 is an exemplary $^1$H NMR spectrum of non-1 (bottom) and non-1-H (top) in $CDCl_3$ at 25° C., according to an embodiment of the disclosed invention.

Exemplary NMR spectroscopic data for hydrogenated homopolymer Poly(1-nonyne) is illustrated in FIG. 8. FIG. 8 shows $^1H$ NMR spectrum of non-1 (bottom) and non-1-H (top) in $CDCl_3$ at 25° C., according to an embodiment of the disclosed invention.

Figure 9:
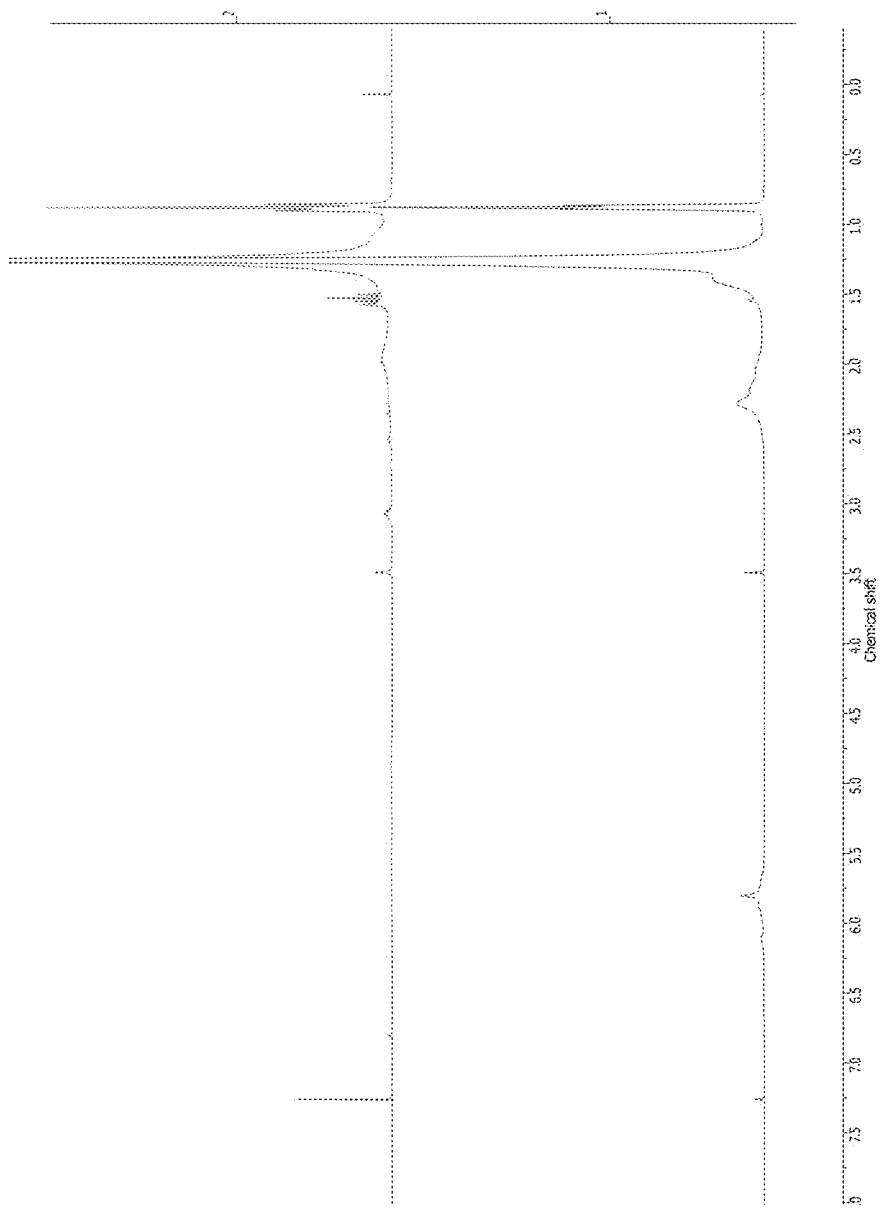
FIG. 9 is an exemplary $^1$H NMR spectrum of Ptd-1 (bottom) and Ptd-1-H (top) in $CDCl_3$ at 25° C., according to an embodiment of the disclosed invention.

Exemplary NMR spectroscopic data for hydrogenated homopolymer Poly(1-pentadecyne) is illustrated in FIG. 9. FIG. 9 shows $^1H$ NMR spectrum of Ptd-1 (bottom) and Ptd-1-H (top) in $CDCl_3$ at 25° C., according to an embodiment of the disclosed invention.

Figure 10:
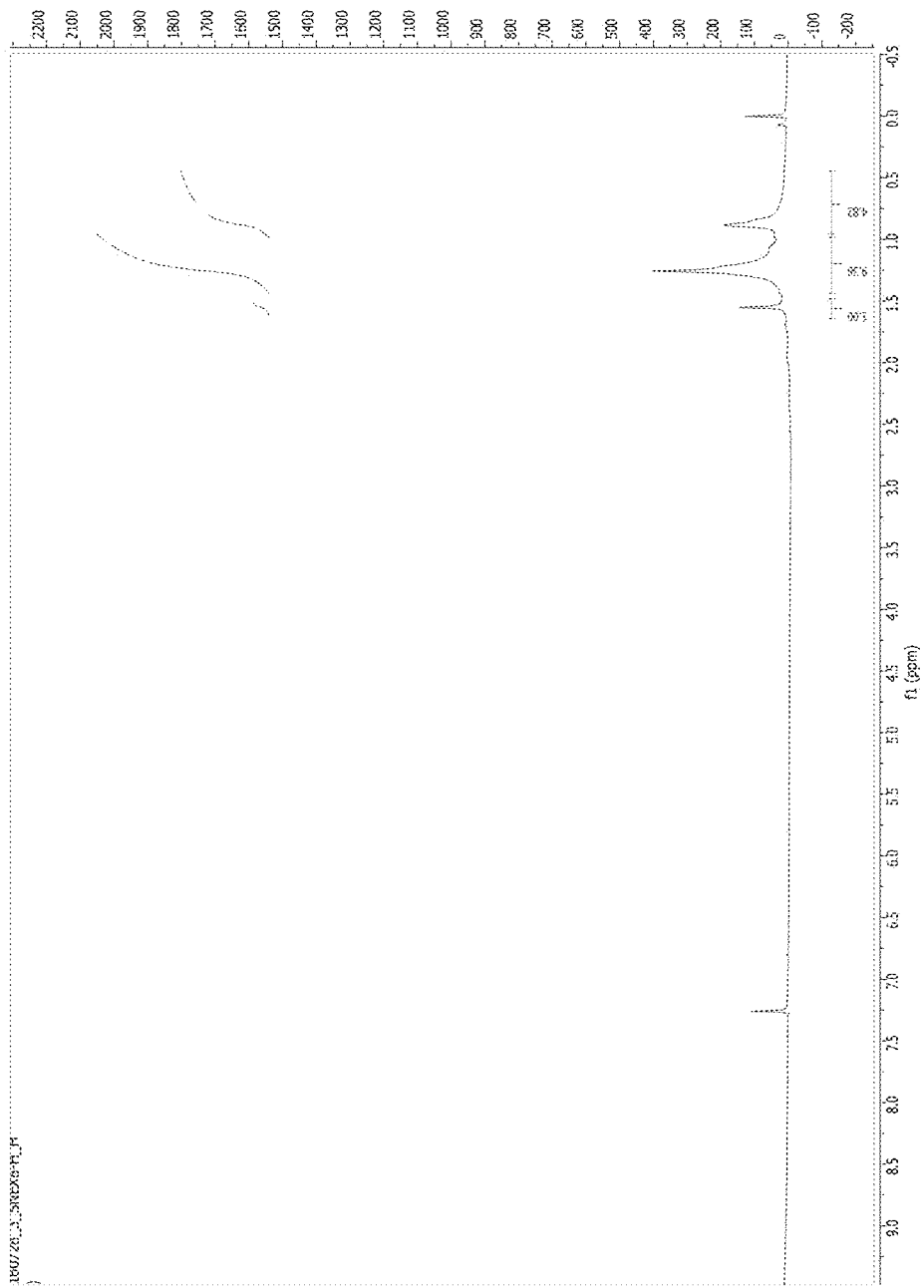
FIG. 10 is an exemplary $^1$H NMR spectrum of Ac-Hex-H-1 in $CDCl_3$ at 25° C., according to an embodiment of the disclosed invention.

Exemplary NMR spectroscopic data for hydrogenated copolymer Acetylene/1-hexyne is illustrated in FIG. 10. FIG. 10 shows $^1H$ NMR spectrum of Ac-Hex-H-1 in $CDCl_3$ at 25° C., according to an embodiment of the disclosed invention.

Figure 11:
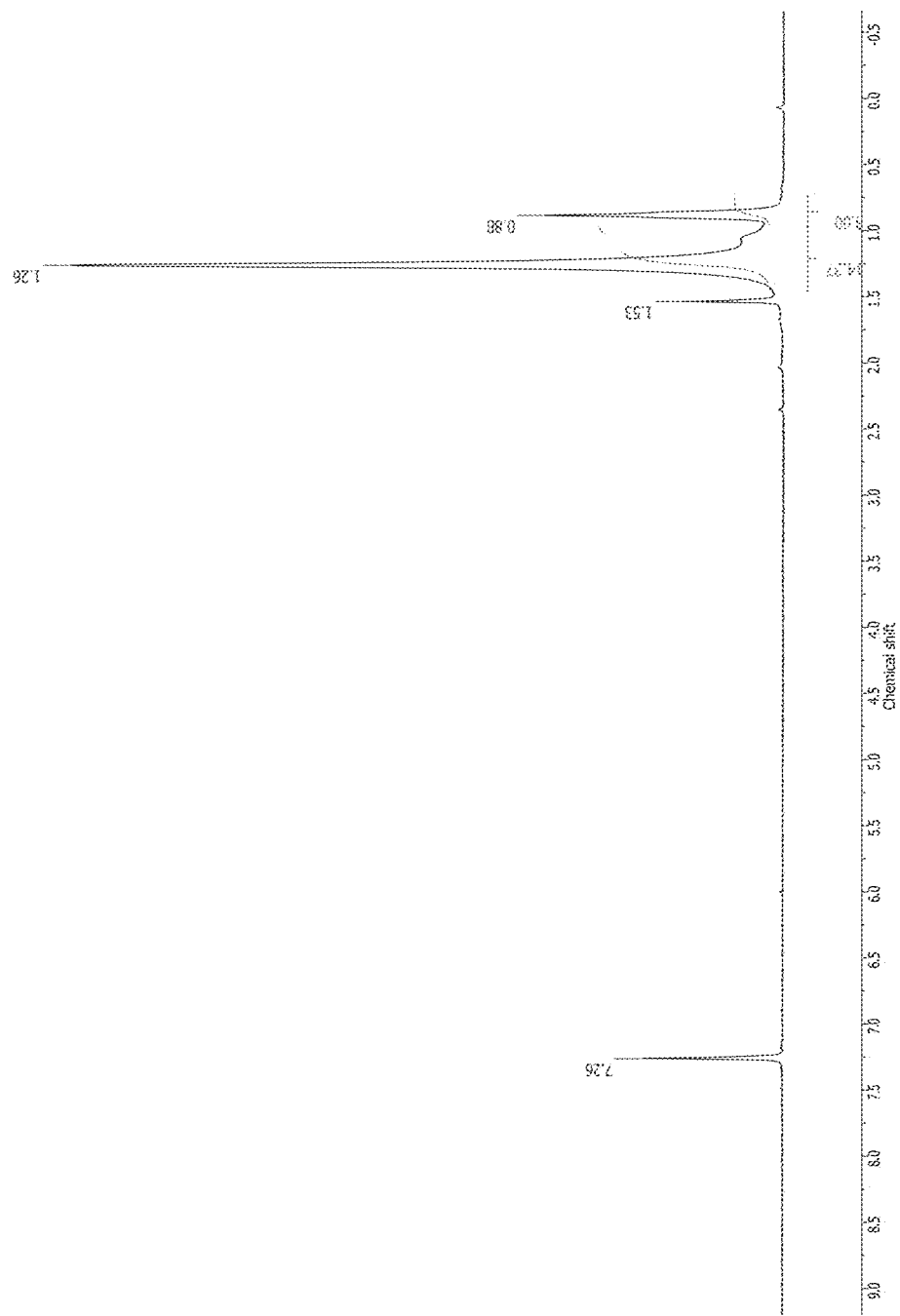
FIG. 11 is an exemplary $^1$H NMR spectrum of Ac-Non-H-1 in CDCl3 at 25° C., according to an embodiment of the disclosed invention.
Figure 12:
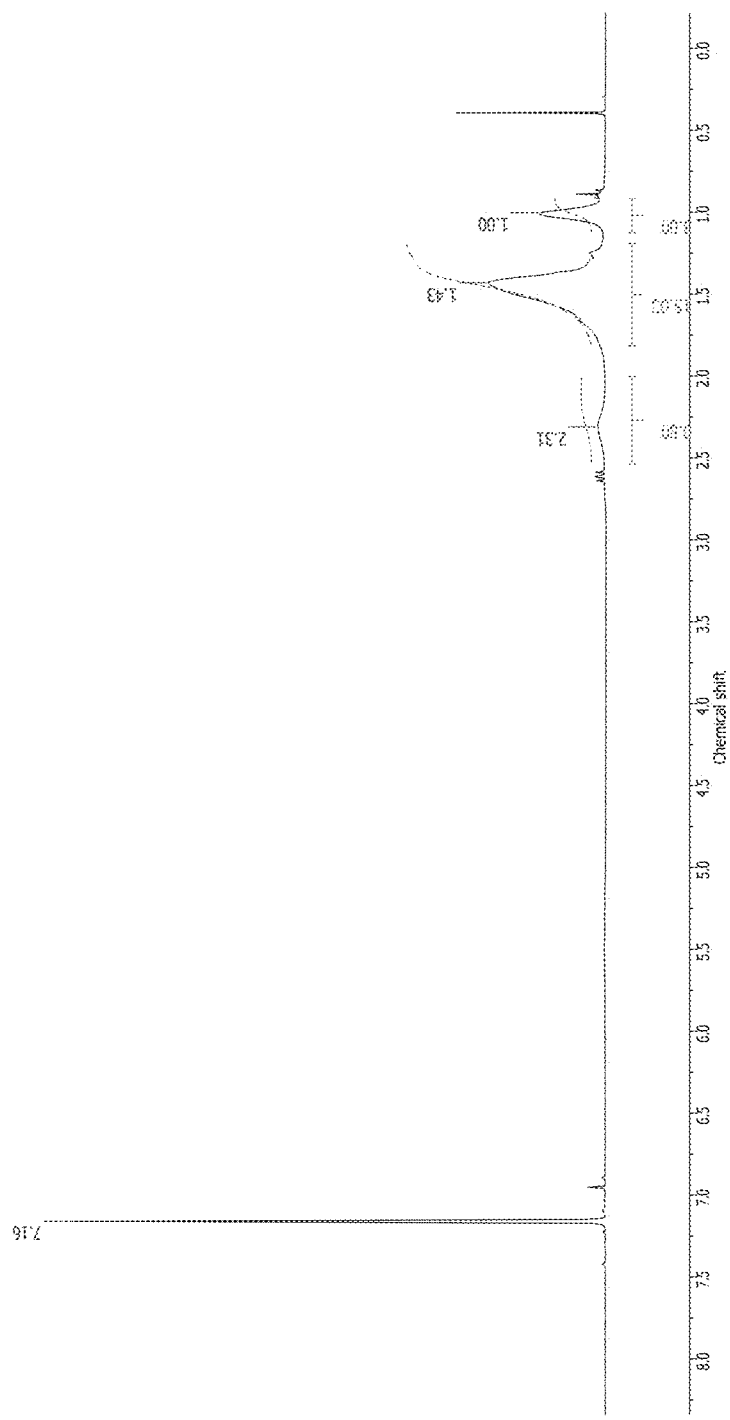
FIG. 12 is an exemplary $^1$H NMR spectrum of Ac-Non-H-2 in C6D6 at 25° C., according to an embodiment of the disclosed invention.
Figure 13:
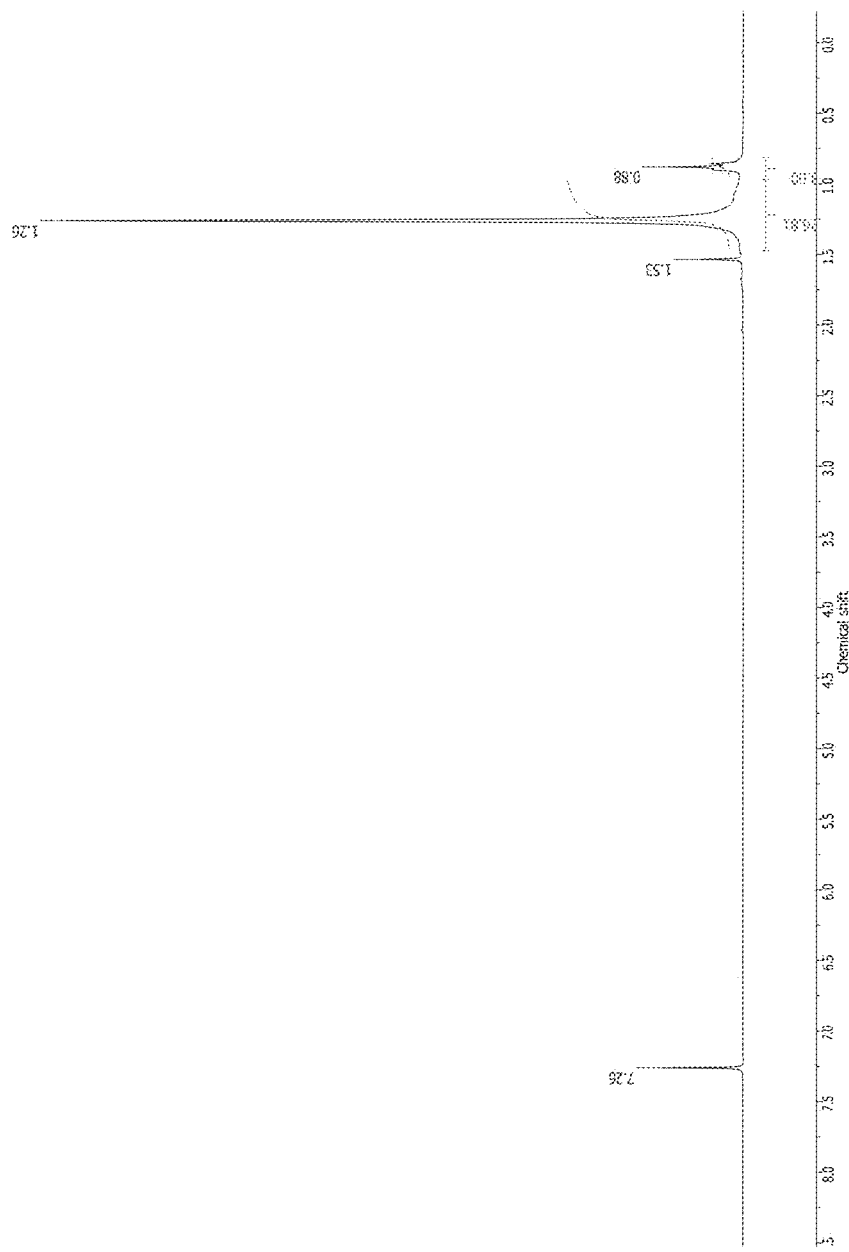
FIG. 13 is an exemplary $^1$H NMR spectrum of Ac-Ptd-H-1 in CDCl3 at 25° C., according to an embodiment of the disclosed invention.

Exemplary NMR spectroscopic data for hydrogenated copolymer Acetylene/1-nonyne is illustrated in FIG. 11 and FIG. 12. FIG. 11 shows $^1H$ NMR spectrum of Ac-Non-H-1 in CDCl3 at 25° C., according to an embodiment of the disclosed invention. FIG. 12 shows $^1H$ NMR spectrum of Ac-Non-H-2 in C6D6 at 25° C., according to an embodiment of the disclosed invention Exemplary NMR spectroscopic data for hydrogenated copolymer Acetylene/1-pentadecyne is illustrated in FIG. 13. FIG. 13 shows $^1H$ NMR spectrum of Ac-Ptd-H-1 in CDCl3 at 25° C., according to an embodiment of the disclosed invention.

Figure 14:
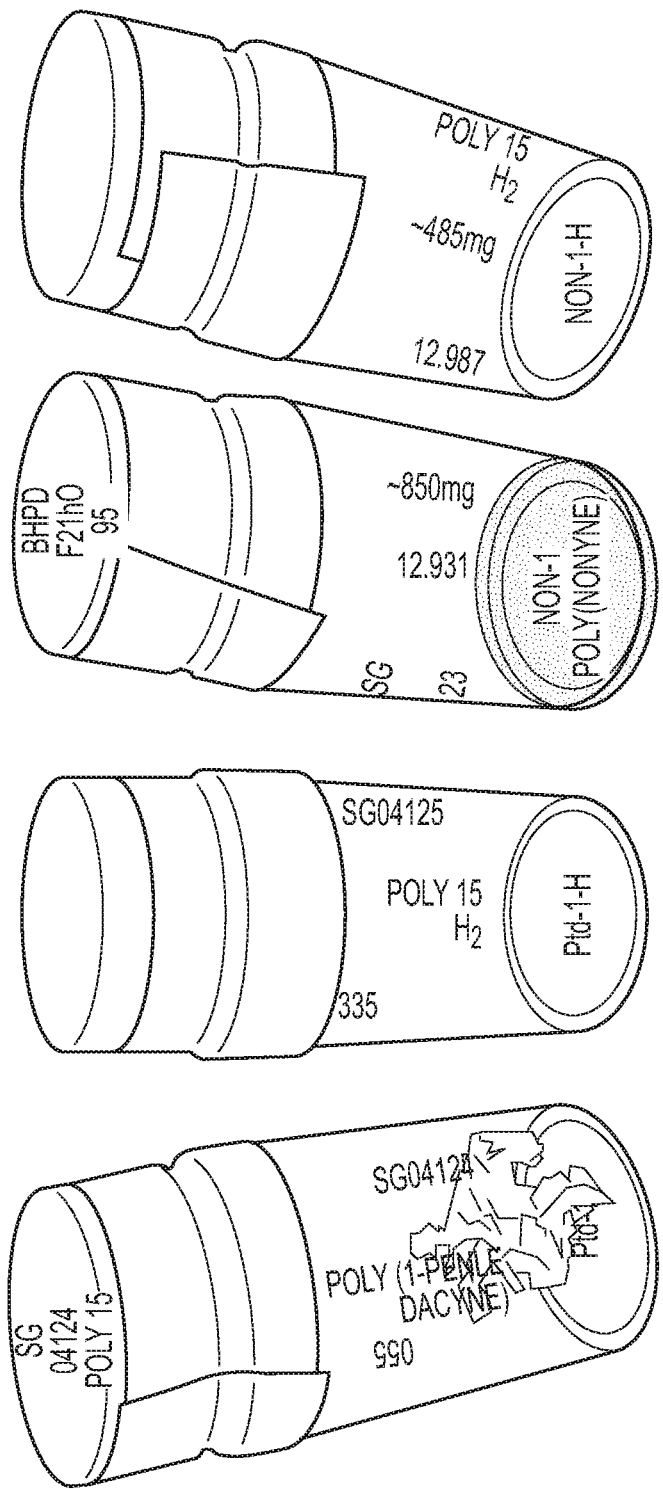
FIG. 14. is a picture of exemplary saturated cyclic polymers, according to an embodiment of the disclosed invention.

FIG. 14 is a picture of exemplary saturated cyclic polymers.

Hydrogenation Using Crabtree's Catalyst

Crabtree's catalyst ($[Ir(COD)(py)(PCy_3)]^+[PF_6]^-$, where COD=cyclooctatetraene, py=pyridine, and Cy=cyclohexane) is tested for hydrogenation of homopolymer (poly(1-pentadecyne). In an argon or nitrogen filled glove-box, the polymer to be hydrogenated is dissolved in dichloromethane (DCM) upon stirring at room temperature for few minutes. The round bottom flask containing the polymer is capped with a rubber septum and brought out of the glovebox. 1 wt % of Crabtree's catalyst ([Ir(COD)(py)(PCy3)]+[PF6]−) is dissolved in 1 mL of DCM, and brought out of the glovebox using a gas-tight Hamilton syringe. After saturating the polymer solution with $H_2$ the catalyst is added to it in one shot. The reaction mixture is stirred for three days with a balloon of $H_2$ attached to it and replaced when necessary. The poly(1-pentadecyne) changes from orange to light yellow. Filtering the reaction mixture through silica to remove the catalyst and evaporating the remaining solvent yields the hydrogenated homopolymer. Unfortunately, the same procedure fails to hydrogenate copolymers.

CONCLUSIONS

This example shows employing complex 4 to synthesize homopolymers of 1-hexyne, 1-octyne, 1-nonyne and 1-pentadecyne, and also their copolymers with acetylene. Hydrogenation of these copolymers utilizing Pd/C yielded branched cyclic polyethylenes. The high pressure hydrogenation using Pd/C as a catalyst is for now the most effective method for the hydrogenation of these copolymers. Alternatively, the use of Crabtree catalyst in a small amount, under 1 atm of $H_2$ at room temperature is a preferable method for the hydrogenation of homopolymers but is still not suitable for copolymers.

Having described the many embodiments of the disclosed invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

It is intended that the invention not be limited to the particular embodiment disclosed herein contemplated for carrying out this invention, but that the invention will include all embodiments falling within the scope of the claims.

REFERENCES

The following references are referred to above and are incorporated herein by reference:
1. Jia. Z. & Monteiro, M. J. Cyclic polymers: methods and strategies. *J. Polym. Sci. A* 50, 2085-2097 (2012).
2. Tezuka, Y. Topological Polymer Chemistry: Progress of Cyclic Polymers in Syntheses, Properties and Functions (World Scientific Publishing Company, 2012).
3. Garcia Bernal, J. M., Tirado, M. M., Freire, J. J. & Garcia de la Torre, J. Monte Carlo calculation of hydrodynamic properties of linear and cyclic polymers in good solvents. *Macromolecules* 24, 593-598 (1991).
4. Orrah. D. J. Semlyen, J. A. & Ross-Murphy, S. B. Studies of cyclic and linear poly(dimethylsiloxanes): 28. Viscosities and densities of ring and chain poly(dimethylsiloxane) blends. *Polymer* 29, 1455-1458 (1988).
5. Bannister, D. J. & Semlyen, J. A. Studies of cyclic and linear poly(dimethyl siloxanes): 6. Effect of heat *Polymer* 22, 377-381 (1981).
6. Clarson, S. J., Dodgson, K. & Semlyen, J. A. Studies of cyclic and linear poly(dimethylsiloxanes): 19. Glass-transition temperatures and crystallization behavior. *Polymer* 26, 930-934 (1985).
7. Griffiths, P. C., Stilbs, P., Yu, C. E. & Booth, C. Role of molecular architecture in polymer diffusion: a PGSE-NMR study of linear and cyclic poly(ethylene oxide). *J. Phys. Chem.* 99, 16752-16756 (1995).
8. Santangelo, P. G., Roland, C. M., Chang, T., Cho, D. & Roovers, J. Dynamics near the glass temperature of low molecular weight cyclic polystyrene. *Macromolecules* 34, 9002-9005 (2001).
9. Patel, A., Cosgrove, T. & Semlyen, J. A. Studies of cyclic and linear poly(dimethylsiloxanes): 30. Adsorption studies on silica in solution. *Polymer* 32, 1313-1317 (1991).
10. Flory, P. J. & Semlyen, J. A. Macrocyclization equilibrium constants and the statistical configuration of poly (dimethylsiloxane) chains. *J. Am. Chem. Soc.* 88, 3209-3212. (1966).
11. Pasini, D. The click reaction as an efficient tool for the construction of macrocyclic structures. *Molecules* 18, 9512-9530 (2013).
12. Pangilinan, K. & Advincula, R. Cyclic polymers and catenanes by atom transfer radical polymerization (ATRP). *Polym. Int.* 63, 803-813 (2014).
13. Kricheldorf, H. R. Cyclic polymers: synthetic strategies and physical properties. *J. Polym. Sci. A* 48, 251-284 (2010).
14. Kapnistos, M. et al. Unexpected power-law stress relaxation of entangled ring polymers. *Nature Mater.* 7, 997-1002 (2008).
15. Laurent, B. A. & Grayson, S. M. Synthetic approaches for the preparation of cyclic polymers. *Chem. Soc. Rev.* 2009, 2202-2213 (2009).
16. Ishizu, K. K. H. Novel synthesis and characterization of cyclic polystyrenes. *Polymer* 37, 1487-1492 (1996).
17. Hoskins, J. N. & Grayson, S. M. Cyclic polyesters: synthetic approaches and potential applications. *Polym. Chem.* 2, 289-299 (2011).
18. Shin, E. J. et al. Crystallization of cyclic polymers: synthesis and crystallization behavior of high molecular weight cyclic poly(ε-caprolactone)s. *Macromolecules* 44, 2773-2779 (2011).
19. Hans, R. & Kricheldorf, S.-R. L. Polylactones. 35. Macrocyclic and stereoselective polymerization of β-D, L-butyrolactone with cyclic dibutyltin initiators. *Macromolecules* 28, 6718-6725 (1995).
20. Brown, H. A. & Waymouth, R. M. Zwitterionic ring-opening polymerization for the synthesis of high molecular weight cyclic polymers. *Acc. Chem. Res.* 46, 2585-2596 (2013).
21. Brown, H. A., Chang, Y. A. & Waymouth, R. M. Zwitterionic polymerization to generate high molecular weight cyclic poly(carbosiloxane)s. *J. Am. Chem. Soc.* 135, 18738-18741(2013).
22. Asenjo-Sanz, I., Veloso, A., Miranda, J. I., Pomposo, J. A. & Barroso-Bujans, F. Zwitterionic polymerization of glycidyl monomers to cyclic polyethers with $B(C_6F_5)_3$. *Polym. Chem.* 5, 6905-6908 (2014).
23. Bielawski, C. W., Benitez, D. & Grubbs, R. H. An 'endless' route to cyclic polymers. *Science* 297, 2041-2044 (2002).
24. Xia, Y. et al. Ring-expansion metathesis polymerization: catalyst-dependent polymerization profiles. *J. Am. Chem. Soc.* 131, 2670-2677 (2009).
25. Kricheldorf, H. R., Stricker. A. &. Gomurashvili. Z. Polymers of carbonic acid, 30 ring-expansion polymerization of trimethylene carbonate (TMC, 1,3-dioxanone-2) with dibutyltin succinate or adipate. *Macromol. Chem. Phys.* 202, 413-420 (2001).

26. Bielawski, C. W., Benitez, D. & Grubbs, R. H. Synthesis of cyclic polybutadiene via ring-opening metathesis polymerization: the importance of removing trace linear contaminants. *J. Am. Chem. Soc.* 125, 8424-8425 (2003).
27. Nakao, K. et al. Giant macrocycles composed of thiophene, acetylene, and ethylene building blocks. *J. Am. Chem. Soc.* 128, 16740-16747 (2006).
28. Dutta, T. et al. Synthesis and self-assembly of triphenylene-containing conjugated macrocycles. *RSC Adv.* 3, 6008-6015 (2013).
29. Iyoda, M., Yamakawa, J. & Rahman, M. J. Conjugated macrocycles: concepts and applications. *Angew. Chem. Int. Ed.* 50, 10522-10553 (2011).
30. Semlyen, J. A. *Cyclic Polymers* 2nd edn (Kluwer Academic Publishers, 2000).
31. O'Reilly, M. E. & Veige, A. S. Trianionic pincer and pincer-type metal complexes and catalysts. *Chem. Soc. Rev.* 2014, 6325-6369 (2014).
32. McGowan, K. P., O'Reilly, M. E., Ghiviriga, I. Abboud, K. A. & Veige, A. S. Compelling mechanistic data and identification of the active species in tungsten-catalyzed alkyne polymerizations: conversion of a trianionic pincer into a new tetraanionic pincer-type ligand. *Chem. Sci.* 2013, 1145-1155 (2013).
33. Kuppuswamy, S., Peloquin, A. J., Ghiviriga, I., Abboud, K. A. & Veige, A. S. Synthesis and characterization of tungsten(VI) alkylidene complexes supported by an [OCO]$^{3-}$ trianionic pincer ligand: progress towards the [$^t$BuOCO]W≡CC(CH$_3$)$_3$ fragment. *Organometallics* 29, 4227-4233 (2010).
34. Boydston, A. J., Xia, Y., Kornfield. J. A., Gorodetskaya, I. A. & Grubbs, R. H. Cyclic ruthenium-alkylidene catalysts for ring-expansion metathesis polymerization. *J. Am. Chem. Soc.* 130, 12775-12782 (2008).
35. Zimm, B. H. & Stockmayer, W, H. The dimensions of chain molecules containing branches and rings. *J. Chem. Phys.* 17, 1301-1314 (1949).
36. Mastrorilli, P. et al. Polymerization of phenylacetylene and of p-tolylacetylene catalyzed by β-dioxygenatorhodium(I) complexes in homogeneous and heterogeneous phase, *J. Mol. Catal.* 178, 35-42 (2002).
37. Trhlíková, O., Zedník, J., Balcar, R., Brus, J. & Sedláček. J. [Rh(cycloolefin)(acac)] complexes as catalysts of polymerization of aryl- and alkylacetylenes: influence of cycloolefin ligand and reaction conditions. *J. Mol. Catal. A* 378, 57-66 (2013)
38. Roovers, J. Dilute-solution properties of ring polystyrenes. *J. Polym. Sci. B* 23, 1117-1126(1985).
39. Benmouna. M. & Maschke, U. in *Cyclic Polymers* (ed. Semlyen, J. A.) 781-782 (Kluwer Academic Publishers, 2000).
40. Hoskins, J. N. & Grayson, S. M. Synthesis and degradation behavior of cyclic poly(ε-caprolactone). *Macromolecules* 42, 6406-6413 (2009).
41. Christopher D. Roland, Hong Li, Khalil A. Abboud, Kenneth B. Wagener & Adam S. Veige, Cyclic polymers from alkynes, Nature Chemistry 8(8), 791796 (2016).
42. Stella A. Gonsales, Tomohiro Kubo, Madison K. Flint, Khalil A. Abboud, Brent S. Sumerlin, and Adam S. Veige, Highly Tactic Cyclic Polynorbornene: Stereoselective Ring Expansion Metathesis Polymerization of Norbornene Catalyzed by a New Tethered Tungsten-Alkylidene Catalyst, *J. Am. Chem. Soc.,* 2016, 138 (15), pp 4996-499

All documents, including any priority documents, patents, journal articles and other materials cited in the present application are incorporated herein by reference.

While the disclosed invention has been disclosed with references to certain embodiments, numerous modification, alterations, and changes to the described embodiments are possible without departing from the sphere and scope of the disclosed invention, as defined in the appended claims. Accordingly, it is intended that the disclosed invention not be limited to the described embodiments, but that it has the full scope defined by the language of the following claims, and equivalents thereof.

What is claimed is:

1. A composition comprising a cyclic copolymer having a structural formula:

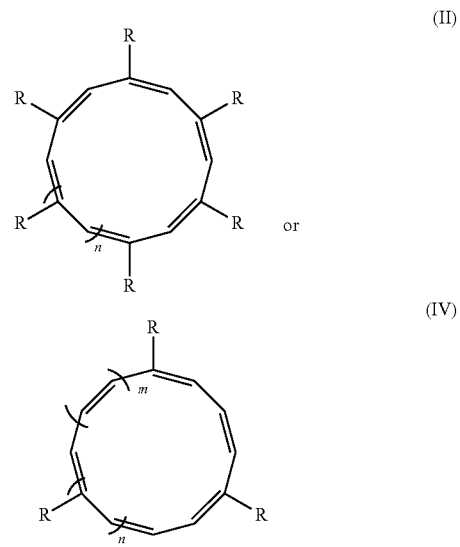

wherein: R is selected from n-butyl, n-hexyl, n-heptyl, and n-tetradecyl;
n is an integer of at least 1; and
m is an integer of at least 1.

2. The composition of claim 1, wherein each R is n-butyl.
3. The composition of claim 1, wherein each R is n-hexyl.
4. The composition of claim 1, wherein each R is n-heptyl.
5. The composition of claim 1, wherein each R is n-tetradecyl.
6. A composition comprising a saturated cyclic random copolymer of acetylene and a second alkyne monomer having a structural formula:

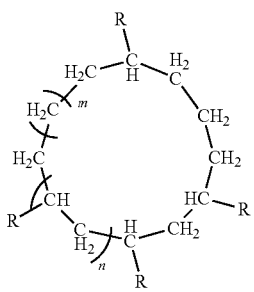

wherein: R is n-butyl, n-hexyl, n-heptyl, or n-tetradecyl;
n is an integer of at least 1;
m is an integer of at least 1; and
the ratio of n/m is less than 1.

7. The composition of claim 6, wherein each R is n-butyl.
8. The composition of claim 6, wherein each R is n-hexyl.
9. The composition of claim 6, wherein each R is n-heptyl.
10. The composition of claim 6, wherein each R is n-teteradecyl.
11. A composition comprising a saturated cyclic homopolymer having a structural formula:

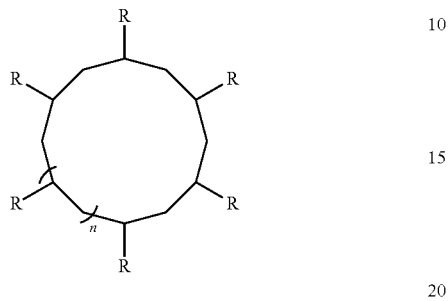

wherein R is n-butyl or n-tetradecyl; and
n is an integer greater than or equal to 1.
12. The composition of claim 11, where each R is n-butyl.
13. The composition of claim 11, where each R is n-tetradecyl.

* * * * *

UNITED STATES PATENT AND TRADEMARK OFFICE
CERTIFICATE OF CORRECTION

PATENT NO. : 11,725,068 B2
APPLICATION NO. : 17/484693
DATED : August 15, 2023
INVENTOR(S) : Adam S. Veige Page 1 of 1

It is certified that error appears in the above-identified patent and that said Letters Patent is hereby corrected as shown below:

On the Title Page

At item (60), "(60)" should be -- (63) --.

In the Claims

Column 25, Line 5, Claim 10, "n-teteradecyl." should be -- n-tetradecyl. --.

Column 25, Line 21, Claim 11, "wherein" should be -- wherein: --.

Signed and Sealed this
Third Day of September, 2024

Katherine Kelly Vidal
*Director of the United States Patent and Trademark Office*